(12) United States Patent　　(10) Patent No.: US 9,354,796 B2
Puckett　　(45) Date of Patent: May 31, 2016

(54) REFERRAL SLIDER

(71) Applicant: Dropbox, Inc., San Francisco, CA (US)

(72) Inventor: Joshua Puckett, Mountain View, CA (US)

(73) Assignee: DROPBOX, INC., San Francisco, CA (US)

( * ) Notice: Subject to any disclaimer, the term of this patent is extended or adjusted under 35 U.S.C. 154(b) by 291 days.

(21) Appl. No.: 13/958,183

(22) Filed: Aug. 2, 2013

(65) Prior Publication Data

US 2015/0040068 A1　　Feb. 5, 2015

(51) Int. Cl.
*G06F 3/0484*　　(2013.01)
*G06F 3/0481*　　(2013.01)
*G06Q 30/02*　　(2012.01)

(52) U.S. Cl.
CPC ........ *G06F 3/04847* (2013.01); *G06F 3/04817* (2013.01); *G06Q 30/0214* (2013.01)

(58) Field of Classification Search
CPC ............ G06Q 30/0214; G06F 3/04817; G06F 3/04847
See application file for complete search history.

(56) References Cited

U.S. PATENT DOCUMENTS

| 5,969,720 | A | 10/1999 | Lisle et al. |
| 8,284,198 | B1 | 10/2012 | Hackworth et al. |
| 8,756,501 | B1* | 6/2014 | Karam ........................ 715/700 |
| 2009/0017913 | A1* | 1/2009 | Bell et al. ....................... 463/40 |
| 2009/0191962 | A1* | 7/2009 | Hardy et al. .................... 463/29 |
| 2009/0276588 | A1* | 11/2009 | Murase ......................... 711/160 |
| 2010/0057565 | A1* | 3/2010 | Au-Yeung et al. .......... 705/14.53 |
| 2012/0215604 | A1* | 8/2012 | Canetto ...................... 705/14.16 |
| 2013/0254289 | A1* | 9/2013 | Cutri et al. .................... 709/204 |
| 2014/0100020 | A1* | 4/2014 | Carroll et al. .................. 463/25 |
| 2014/0136990 | A1* | 5/2014 | Gonnen et al. ................ 715/752 |
| 2014/0270547 | A1 | 9/2014 | Dwan et al. |
| 2014/0280200 | A1 | 9/2014 | Dwan et al. |
| 2014/0282901 | A1 | 9/2014 | Dwan et al. |

OTHER PUBLICATIONS

Barracuda, "Barracuda's Cloud Storage Extravaganza with Copy," http://johnfail.wordpress.com/2013/03/16/barracudas-cloud-storage-extravaganza-with-copy/.
Microsoft, "SkyDrive," http://www.starkinsider.com/2012/04/microsoft-updates-skydrive-beats-google-to-the-cloud-sort-of.html.
Wuala, "FAQ, Referral Program", http://www.wuala.com/en/support/faq/e/30, dated May 14, 2013, 2 pages.

(Continued)

*Primary Examiner* — Aaron Lowenberger
(74) *Attorney, Agent, or Firm* — Hickman Palermo Becker Bingham LLP

(57) ABSTRACT

Various embodiments generally relate to user interface elements informative of referral incentives. In some embodiments, contact information may be obtained for contacts associated with a user of a content management system. Various amounts of additional storage space available to the user upon acceptance of referral requests sent by or on behalf of the user to the contacts may be determined. One or more graphic indicator of various types may be displayed to the user indicating one or more of: amounts of additional storage space obtainable through successful new referrals, the user's current storage space, and the relative sizes of the user's current storage space and the amounts of additional storage space.

25 Claims, 11 Drawing Sheets

(56) References Cited

OTHER PUBLICATIONS

Spider Oak Online, "Refer-A-Friend or 2 or 3 . . . ", https://spideroak.com/referral/, dated May 14, 2013, 2 pages.

Referral Program FAQ, "Frequently Asked Questions", http://www.sugarync.com/faq/referral_program.html, dated May 14, 2013.

Mozy, Free Online Storage, "Free Backup and Sync Software", dated 2013, http://mozy.com/free?ref=451c76aa, 1 page.

Brodia, Rick, "Get an Extra 250MB of DropBox Storage", CES 2015 Coverage on PCWorld, Web and Communications Software, last viewed on Oct. 22, 2015, 2 pages.

* cited by examiner

REFERRAL SLIDER

FIELD OF THE INVENTION

Various embodiments generally relate to user interface elements informative of referral incentives.

BACKGROUND

Although word of mouth can be an effective way to inform potential users of the availability of a service and/or an application, providing a mechanism that allows an existing user to communicate a referral (e.g., via a default email or message) may increase the number of referrals made to the service and/or application by the sheer virtue of the ease of communicating the referral. In addition, incentivizing referrals (e.g., with rewards and/or additional services) can serve to encourage more existing users to make more referrals. However, intangible rewards or gains may be difficult for users to visualize, because the offered benefits may be intangible and therefore not readily apparent. Therefore, it would be beneficial to provide a mechanism for visually and/or graphically displaying the potential rewards available to users resulting from making referrals.

SUMMARY

Systems, methods, and non-transitory computer readable mediums for displaying a graphic indicator capable of informing an existing user of potential additional storage space available to the user upon acceptance of a referral request sent to one or more of the existing user's contacts are provided. Such systems can include one or more processors, a display, and memory containing instructions.

Such methods can include obtaining contact information for at least one contact associated with a user of a content management system ("CMS"). The at least one contact associated with the user of the content management system can include, for example, phone contacts, email contacts, social media contacts and friends, and/or any other third party application contacts. An amount of additional storage space available to the user of the CMS upon acceptance of a first referral request sent to the at least one contact can be determined, and the user may be informed of the relative magnitude of the additional storage space being offered. Calculation of the amount of additional storage space can include determining at least one common factor between the user and the at least one contact. In some embodiments, the common factor can include a common email domain name, a common social media network, and/or a content share history on the CMS. In some embodiments, a graphic indicator can be displayed indicating one or more of: an amount of additional storage space available to the user upon the referral signing up (known as a "completed referral"), the user's current storage space and the amount of additional storage space, and/or the relative quantities of the user's current storage space and the amount of additional storage space.

BRIEF DESCRIPTION OF THE DRAWINGS

The above and other aspects and advantages of the invention will become more apparent upon consideration of the following detailed description, taken in conjunction with accompanying drawings, in which like referenced characters refer to like parts throughout, and in which.

DETAILED DESCRIPTION OF THE DISCLOSURE

Figure 1:
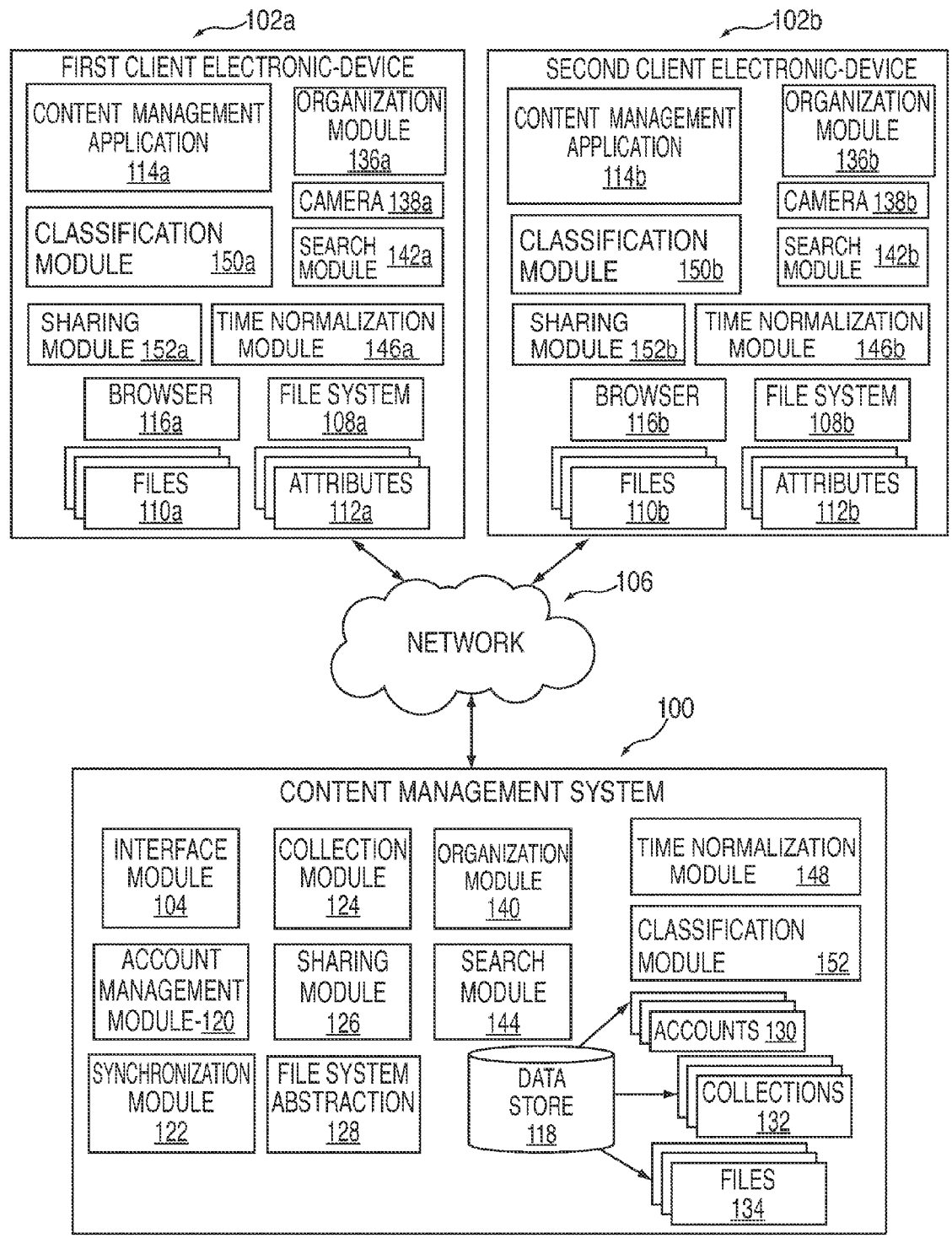
FIG. 1 is an exemplary system for a referral slider in accordance with various embodiments.

Methods, systems, and computer readable media for providing interface elements informative of referral incentives available to the user are provided. Graphics that allow a user to visualize the benefits of providing referral requests to associated contacts may be provided. Such graphics can include referral sliders that present potential amounts of additional storage space available to the user upon acceptance of various referral requests that are sent.

Referral requests can be any request to join made by a user of a client device to one or more contacts associated with the user of the client device. In some embodiments, contacts can include phone contacts, email contacts, social media friends/contacts, work contacts, business contacts, other types of contact and any combination thereof. In some embodiments, the contacts can correspond to the user or users of one or more client devices, a content management system, or any combination thereof.

In some embodiments, a graphic indicator of an incentive available to a user in return for a completed referral may be a type of slider or slider bar. Such an indicator may be referred to herein as a "referral slider." Referral sliders may be displayed on a user interface, such as a user interface viewable on an electronic device. User interfaces may provide information corresponding to contacts associated with a user of a content management system (e.g., name, contact information). User interfaces may also provide selection options that may allow a user to select one or more associated contacts to send referral requests.

For purposes of description and simplicity, methods, systems and computer readable media will be described for a referral slider, and in particular, a referral slider to visualize potential amounts of additional storage space available to a user upon acceptance of a referral request sent to one or more contacts. However, the terms "device" and "content management system" are used herein to refer broadly to a wide variety of storage providers and management service providers, electronic devices and mobile devices, as well as to a wide variety of types of content, files, portions of files, and/or other types of data. The term "user" is also used herein broadly and can correspond to a single user, multiple users, authorized accounts, or any other user type, or any combination thereof. Those with skill in the art will recognize that the methods, systems, and media described for referral sliders may be used for a variety of storage providers/services and types of content, files, portions of files, and/or other types of data.

The present invention may take form in various components and arrangements of components, and in various techniques, methods, or procedures and arrangements of steps. The referenced drawings are only for the purpose of illustrating embodiments, and are not to be construed as limiting the present invention. Various inventive features are described below that can each be used independently of one another or in combination with other features.

FIG. 1 is an exemplary system for a referral slider in accordance with some embodiments of the invention. Elements in FIG. 1, including, but not limited to, first client electronic device 102a, second client electronic device 102b, and content management system 100 may communicate by sending and/or receiving data over network 106. Network 106 may be any network, combination of networks, or network devices that can carry data communication. For example, network 106 may be any one or any combination of LAN (local area network), WAN (wide area network), telephone network, wireless network, point-to point network, star network, token ring network, hub network, or any other configuration.

Network 106 can support any number of protocols, including but not limited to TCP/IP (Transfer Control Protocol and Internet Protocol), HTTP (Hypertext Transfer Protocol), WAP (wireless application protocol), etc. For example, first client electronic device 102a and second client electronic device 102b (collectively 102) may communicate with content management system 100 using TCP/IP, and, at a higher level, use browser 116 to communicate with a web server (not shown) at content management system 100 using HTTP. Examples of implementations of browser 116, include, but are not limited to, Google Inc. Chrome™ browser, Microsoft Internet Explorer®, Apple Safari®, Mozilla Firefox, and Opera Software Opera.

A variety of client electronic devices 102 can communicate with content management system 100, including, but not limited to, desktop computers, mobile computers, mobile communication devices (e.g., mobile phones, smart phones, tablets), televisions, set-top boxes, and/or any other network enabled device. Although two client electronic devices 102a and 102b are illustrated for description purposes, those with skill in the art will recognize that any number of devices may be used and supported by content management system 100. Client electronic devices 102 may be used to create, access, modify, and manage files 110a and 110b (collectively 110) (e.g. files, file segments, images, etc.) stored locally within file system 108a and 108b (collectively 108) on client electronic device 102 and/or stored remotely with content management system 100 (e.g., within data store 118). For example, client electronic device 102a may access file 110b stored remotely with data store 118 of content management system 100 and may or may not store file 110b locally within file system 108a on client electronic device 102a. Continuing with the example, client electronic device 102a may temporarily store file 110b within a cache (not shown) locally within client electronic device 102a, make revisions to file 110b, and the revisions to file 110b may be communicated and stored in data store 118 of content management system 100. Optionally, a local copy of the file 110a may be stored on client electronic device 102a.

Client devices 102 may capture, record, and/or store content items, such as image files 110. Client devices 102 may have a camera 138 (e.g., 138a and 138b) to capture and record digital images and/or videos. For example, camera 138 may capture and record images and store metadata with the images. Metadata may include, but is not limited to, the following: creation time timestamp, geolocation, orientation, rotation, title, and/or any other attributes or data relevant to the captured image.

Metadata values may be stored as attribute 112 name-value pairs, tag-value pairs, and/or any other method to associate the metadata with the file and easily identify the type of metadata. In some embodiments, attributes 112 may be tag-value pairs defined by a particular standard, including, but not limited to, Exchangeable Image File Format (Exif), JPEG File Interchange Format (Jfif), and/or any other standard.

A time normalization module 146 (e.g., 146a and 146b) may be used to normalize dates and times stored with a content item. An example of time normalization is provided in U.S. patent application Ser. No. 13/888,118, entitled "Date and Time Handling," filed on May 6, 2013, which claims the benefit of U.S. Provisional Patent Application No. 61/801,318, entitled "Date and Time Handling," filed on Mar. 15, 2013, both of which are incorporated herein by reference in their entirety. The time normalization module 146, counterpart time normalization module 148, and/or any combination thereof may be used to normalize dates and times stored for content items. The normalized times and dates may be used to sort, group, perform comparisons, perform basic math, and/or cluster content items.

An organization module 136 (e.g., 136a and 136b) may be used to organize content items (e.g., image files) into clusters, organize content items to provide samplings of content items for display within user interfaces, and/or retrieve organized content items for presentation. An example of organization is described in U.S. patent application Ser. No. 13/888,186, entitled "Presentation and Organization of Content," filed on May 6, 2013, which claims the benefit of U.S. Provisional Patent Application No. 61/794,184, entitled "Presentation and Organization of Content," filed on Mar. 15, 2013, both of which are incorporated herein by reference in their entirety.

The organization module 136 may utilize any clustering algorithm. The organization module 136 may be used to identify similar images for clusters in order to organize content items for presentation within user interfaces on devices 102 and content management system 100. Similarity rules may be defined to create one or more numeric representations embodying information on similarities between each of the content items in accordance with the similarity rules. The organization module 136 may use the numeric representation as a reference for similarity between content items in order to cluster the content items.

In some embodiments, content items may be organized into clusters to aid with retrieval of similar content items in response to search requests. For example, organization module 136a may identify that first and second images are similar and may be group the images together in a cluster. Organization module 136a may process image files to determine clusters independently or in conjunction with counterpart organization module (e.g., 140 and/or 136b). In other embodiments, organization module 136a may only provide clusters identified with counterpart organization modules (e.g., 140 and/or 136b) for presentation. Continuing with the example, processing of image files to determine clusters may be an iterative process that is executed upon receipt of new content items and/or new similarity rules.

In some embodiments, a search module 142 on client device 102 is provided with counterpart search module 144 on content management system 144 to support search for content items. A search request may be received by search module 142 and/or 144 that requests a content item. In some embodiments, the search may be handled by searching metadata and/or attributes assigned to content items during the provision of management services. For example, cluster markers stored with images may be used to find images by date. In particular, cluster markers may indicate an approximate time or average time for the images stored with the cluster marker in some embodiments, and the marker may be used to speed the search and/or return the search results with the contents of the cluster with particular cluster markers.

Files 110 managed by content management system 100 may be stored locally within file system 108 of respective devices 102 and/or stored remotely within data store 118 of content management system 100 (e.g., files 134 in data store 118). Content management system 100 may provide synchronization of files managed by content management system 100. Attributes 112*a* and 112*b* (collectively 112) or other metadata may be stored with files 110. For example, a particular attribute may be stored with the file to track files locally stored on client devices 102 that are managed and/or synchronized by content management system 100. In some embodiments, attributes 112 may be implemented using extended attributes, resource forks, or any other implementation that allows for storing metadata with a file that is not interpreted by a file system. In particular, an attribute 112*a* and 112*b* may be a content identifier for a file. For example, the content identifier may be a unique or nearly unique identifier (e.g., number or string) that identifies the file.

By storing a content identifier with the file, a file may be tracked. For example, if a user moves the file to another location within the file system 108 hierarchy and/or modifies the file, then the file may still be identified within the local file system 108 of a client device 102. Any changes or modifications to the file identified with the content identifier may be uploaded or provided for synchronization and/or version control services provided by the content management system 100.

A stand-alone content management application 114*a* and 114*b* (collectively 114), client application, and/or third-party application may be implemented to provide a user interface for a user to interact with content management system 100. Content management application 114 may expose the functionality provided with content management interface 104 and accessible modules for device 102. Web browser 116*a* and 116*b* (collectively 116) may be used to display a web page front end for a client application that may provide content management 100 functionality exposed/provided with content management interface 104.

Content management system 100 may allow a user with an authenticated account to store content, as well as perform management tasks, such as retrieve, modify, browse, synchronize, and/or share content with other accounts. Various embodiments of content management system 100 may have elements, including, but not limited to, content management interface module 104, account management module 120, synchronization module 122, collections module 124, sharing module 126, file system abstraction 128, data store 118, and organization module 140. The content management service interface module 104 may expose the server-side or back end functionality/capabilities of content management system 100. For example, a counter-part user interface (e.g., stand-alone application, client application, etc.) on client electronic devices 102 may be implemented using content management service interface 104 to allow a user to perform functions offered by modules of content management system 100. In particular, content management system 100 may have an organization module 140 for identifying similar content items for clusters and samples of content items for presentation within user interfaces.

The user interface offered on client electronic device 102 may be used to create an account for a user and authenticate a user to use an account using account management module 120. The account management module 120 of the content management service may provide the functionality for authenticating use of an account by a user and/or a client electronic device 102 with username/password, device identifiers, and/or any other authentication method. Account information 130 may be maintained in data store 118 for accounts. Account information may include, but is not limited to, personal information (e.g., an email address or username), account management information (e.g., account type, such as "free" or "paid"), usage information, (e.g., file edit history), maximum storage space authorized, storage space used, content storage locations, security settings, personal configuration settings, content sharing data, etc. An amount of content management may be reserved, allotted, allocated, stored, and/or may be accessed with an authenticated account. The account may be used to access files 110 within data store 118 for the account and/or files 110 made accessible to the account that are shared from another account. Account module 120 may interact with any number of other modules of content management system 100.

An account may be used to store content, such as documents, text files, audio files, video files, etc., from one or more client devices 102 authorized on the account. The content may also include folders of various types with different behaviors, or other mechanisms of grouping content items together. For example, an account may include a public folder that is accessible to any user. The public folder may be assigned a web-accessible address. A link to the web-accessible address may be used to access the contents of the public folder. In another example, an account may include a photos folder that is intended for photos and that provides specific attributes and actions tailored for photos; an audio folder that provides the ability to play back audio files and perform other audio related actions; or other special purpose folders. An account may also include shared folders or group folders that are linked with and available to multiple user accounts. The permissions for multiple users may be different for a shared folder.

Content items (e.g., files 110) may be stored in data store 118. Data store 118 may be a storage device, multiple storage devices, or a server. Alternatively, data store 118 may be cloud storage provider or network storage accessible via one or more communications networks. Content management system 100 may hide the complexity and details from client devices 102 by using a file system abstraction 128 (e.g., a file system database abstraction layer) so that client devices 102 do not need to know exactly where the content items are being stored by the content management system 100. Embodiments may store the content items in the same folder hierarchy as they appear on client device 102. Alternatively, content management system 100 may store the content items in various orders, arrangements, and/or hierarchies. Content management system 100 may store the content items in a network accessible storage (SAN) device, in a redundant array of inexpensive disks (RAID), etc. Content management system 100 may store content items using one or more partition types, such as FAT, FAT32, NTFS, EXT2, EXT3, EXT4, ReiserFS, BTRFS, and so forth.

Data store 118 may also store metadata describing content items, content item types, and the relationship of content items to various accounts, folders, collections, or groups. The metadata for a content item may be stored as part of the content item and/or may be stored separately. Metadata may be store in an object-oriented database, a relational database, a file system, or any other collection of data. In one variation, each content item stored in data store 118 may be assigned a system-wide unique identifier.

Data store 118 may decrease the amount of storage space required by identifying duplicate files or duplicate chunks of files. Instead of storing multiple copies, data store 118 may store a single copy of a file 134 and then use a pointer or other mechanism to link the duplicates to the single copy. Similarly, data store 118 may store files 134 more efficiently, as well as provide the ability to undo operations, by using a file version control that tracks changes to files, different versions of files (including diverging version trees), and a change history. The change history may include a set of changes that, when applied to the original file version, produce the changed file version.

Content management system 100 may be configured to support automatic synchronization of content from one or more client devices 102. The synchronization may be platform independent. That is, the content may be synchronized across multiple client devices 102 of varying type, capabilities, operating systems, etc. For example, client device 102a may include client software, which synchronizes, via a synchronization module 122 at content management system 100, content in client device 102 file system 108 with the content in an associated user account. In some cases, the client software may synchronize any changes to content in a designated folder and its sub-folders, such as new, deleted, modified, copied, or moved files or folders. In one example of client software that integrates with an existing content management application, a user may manipulate content directly in a local folder, while a background process monitors the local folder for changes and synchronizes those changes to content management system 100. In some embodiments, a background process may identify content that has been updated at content management system 100 and synchronize those changes to the local folder. The client software may provide notifications of synchronization operations, and may provide indications of content statuses directly within the content management application. Sometimes client device 102 may not have a network connection available. In this scenario, the client software may monitor the linked folder for file changes and queue those changes for later synchronization to content management system 100 when a network connection is available. Similarly, a user may manually stop or pause synchronization with content management system 100.

A user may also view or manipulate content via a web interface generated and served by user interface module 104. For example, the user may navigate in a web browser to a web address provided by content management system 100. Changes or updates to content in the data store 118 made through the web interface, such as uploading a new version of a file, may be propagated back to other client devices 102 associated with the user's account. For example, multiple client devices 102, each with their own client software, may be associated with a single account and files in the account may be synchronized between each of the multiple client devices 102.

Content management system 100 may include sharing module 126 for managing sharing content and/or collections of content publicly or privately. Sharing module 126 may manage sharing independently or in conjunction with counterpart sharing module (e.g., 152a and 152b). Sharing content publicly may include making the content item and/or the collection accessible from any computing device in network communication with content management system 100. Sharing content privately may include linking a content item and/or a collection in data store 118 with two or more user accounts so that each user account has access to the content item. The sharing may be performed in a platform independent manner. That is, the content may be shared across multiple client devices 102 of varying type, capabilities, operating systems, etc. The content may also be shared across varying types of user accounts. In particular, the sharing module 126 may be used with the collections module 124 to allow sharing of a virtual collection with another user or user account. A virtual collection may be a grouping of content identifiers that may be stored in various locations within file system of client device 102 and/or stored remotely at content management system 100.

The virtual collection for an account with a file storage service is a grouping of one or more identifiers for content items (e.g., identifying content items in storage). An example of virtual collections is provided in U.S. Provisional Patent Application No. 61/750,791, entitled "Presenting Content Items in a Collections View," filed on Jan. 9, 2013, and herein incorporated by reference in its entirety. The virtual collection is created with the collection module 124 by selecting from existing content items stored and/or managed by the file storage service and associating the existing content items within data storage (e.g., associating storage locations, content identifiers, or addresses of stored content items) with the virtual collection. By associating existing content items with the virtual collection, a content item may be designated as part of the virtual collection without having to store (e.g., copy and paste the content item file to a directory) the content item in another location within data storage in order to place the content item in the collection.

In some embodiments, content management system 100 may be configured to maintain a content directory or a database table/entity for content items where each entry or row identifies the location of each content item in data store 118. In some embodiments, a unique or a nearly unique content identifier may be stored for each content item stored in the data store 118.

Metadata may be stored for each content item. For example, metadata may include a content path that may be used to identify the content item. The content path may include the name of the content item and a folder hierarchy associated with the content item (e.g., the path for storage locally within a client device 102). In another example, the content path may include a folder or path of folders in which the content item is placed as well as the name of the content item. Content management system 100 may use the content path to present the content items in the appropriate folder hierarchy in a user interface with a traditional hierarchy view. A content pointer that identifies the location of the content item in data store 118 may also be stored with the content identifier. For example, the content pointer may include the exact storage address of the content item in memory. In some embodiments, the content pointer may point to multiple locations, each of which contains a portion of the content item.

In addition to a content path and content pointer, a content item entry/database table row in a content item database entity may also include a user account identifier that identifies the user account that has access to the content item. In some embodiments, multiple user account identifiers may be associated with a single content entry indicating that the content item has shared access by the multiple user accounts.

To share a content item privately, sharing module 126 may be configured to add a user account identifier to the content entry or database table row associated with the content item, thus granting the added user account access to the content item. Sharing module 126 may also be configured to remove user account identifiers from a content entry or database table rows to restrict a user account's access to the content item. The sharing module 126 may also be used to add and remove user account identifiers to a database table for virtual collections.

To share content publicly, sharing module 126 may be configured to generate a custom network address, such as a uniform resource locator (URL), which allows any web browser to access the content in content management system 100 without any authentication. To accomplish this, sharing module 126 may be configured to include content identification data in the generated URL, which may later be used to properly identify and return the requested content item. For example, sharing module 126 may be configured to include the user account identifier and the content path in the generated URL. Upon selection of the URL, the content identification data included in the URL may be transmitted to content management system 100 which may use the received content identification data to identify the appropriate content entry and return the content item associated with the content entry.

To share a virtual collection publicly, sharing module 126 may be configured to generate a custom network address, such as a uniform resource locator (URL), which allows any web browser to access the content in content management system 100 without any authentication. To accomplish this, sharing module 126 may be configured to include collection identification data in the generated URL, which may later be used to properly identify and return the requested content item. For example, sharing module 126 may be configured to include the user account identifier and the collection identifier in the generated URL. Upon selection of the URL, the content identification data included in the URL may be transmitted to content management system 100 which may use the received content identification data to identify the appropriate content entry or database row and return the content item associated with the content entry or database TOW.

In addition to generating the URL, sharing module 126 may also be configured to record that a URL to the content item has been created. In some embodiments, the content entry associated with a content item may include a URL flag indicating whether a URL to the content item has been created. For example, the URL flag may be a Boolean value initially set to 0 or false to indicate that a URL to the content item has not been created. Sharing module 126 may be configured to change the value of the flag to 1 or true after generating a URL to the content item.

In some embodiments, sharing module 126 may also be configured to deactivate a generated URL. For example, each content entry may also include a URL active flag indicating whether the content should be returned in response to a request from the generated URL. For example, sharing module 126 may be configured to only return a content item requested by a generated link if the URL active flag is set to 1 or true. Changing the value of the URL active flag or Boolean value may easily restrict access to a content item or a collection for which a URL has been generated. This allows a user to restrict access to the shared content item without having to move the content item or delete the generated URL. Likewise, sharing module 126 may reactivate the URL by again changing the value of the URL active flag to 1 or true. A user may thus easily restore access to the content item without the need to generate a new URL.

Figure 2:
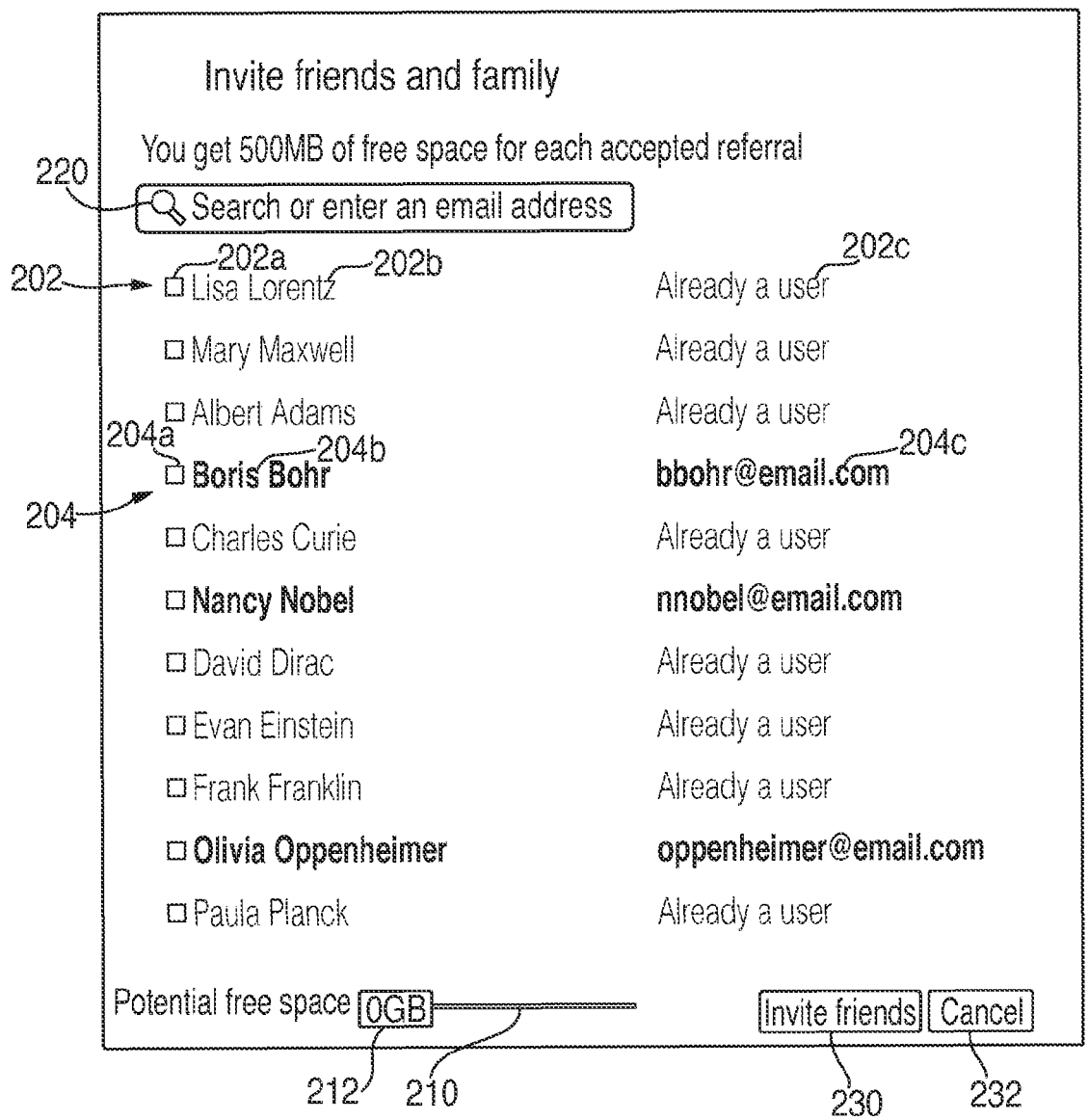
FIG. 2 is an illustrative diagram of a user interface in accordance with various embodiments.

FIG. 2 is an illustrative diagram of user interface 200 in accordance with various embodiments. User interface 200 may display elements that allow a user to visualize potential additional storage space available to the user that may be earned by providing one or more referral requests and the referrals completing. User interface 200 may include, for example, contacts 202 and 204 by name and corresponding contact information. Contacts 202 and 204 are displayed with check boxes 202*a* and 204*a*, contact names 202*b* and 204*b*, and information 202*c* and 204*c*. In some embodiments, selection of check boxes 202*a* and/or 204*a* may trigger a referral request to be communicated with the corresponding contact information. In some embodiments, selection of one or more check boxes (e.g., check boxes 202*a* and/or 202*b*) may occur in conjunction with, and prior to, invocation of an invitation button (e.g., invitation button 230). For example, a user may select check box 202*a* and then select an invitation button to send a referral request. As another example, a user may select check box 202*a*, and upon selection of check box 202*a* a referral request may be sent.

In some embodiments, the user may provide one or more inputs to a device, such as client electronic devices 102, to "select" check box 202*a* and/or 204*a*. For example, a user may click on check box 202*a* corresponding to contact 202 and/or click on selection box 204*b* corresponding to contact 204. As another example, the user may hover over a check box using an input mechanism (e.g., a mouse, stylus, and/or finger) to select a corresponding check box, contact name, and/or contact information. In some embodiments, the user may click on check box 202*a* and/or 202*b* using an input gesture, and may control one or more features of user interface 200 using any combination of gestures. A gesture to click a check box on user interface 200 may be performed using a user's finger(s), hand, arms, or any other object, or any combination thereof. For example, a user controlling a user interface (e.g., user interface 200) via gestures may make a pushing motion in the air which may be processed by a gesture control module and relayed to the user interface as a selection input.

Check boxes 202*a* and/or 204*a* may respectively correspond to contacts 202 and/or 204 which may be associated with first client electronic device 102*a*, second client electronic device 102*b*, and/or an account maintained by content management system 100. In some embodiments, contacts 202 and 204 may be obtained from a user's electronic device, from social media networks, and/or from third party applications. For example, contacts may be obtained from an application on the device storing contact information (e.g., one or more contact applications, storage of contacts with phone, etc.), an email application, a social networking application, and/or any other third party application. In some embodiments, the user may be required to grant access to one or more applications so that contacts information and/or contacts may be obtained. In some embodiments, contacts may be obtained for an account using one or more modules of a content management system, such as account management module 120 of FIG. 1. Account management module 120 may determine persons that an account has shared content with. These "shares" or "sharers" may be presented to the account user who may select one or more as contacts.

User interface 200 may display the obtained contacts 202 and 204. In some embodiments, contact 202 may correspond to a contact that is already a member/subscriber of a service. For example, contact 202 may correspond to a user who is already a member of a content management system. User interface 200 may display contact information, such as the contact name 202*b* and/or name 204*b* (e.g., "Lisa Lorentz" and/or "Boris Bohr"). Names 202*b* and/or 204*b* may display that contact 202 and/or 204 may already have an account with a content management system. In some embodiments, the user may choose not to select the check box corresponding to contact 202 because contact 202 may already have an account with the content management system (e.g., content management system 100 of FIG. 1). Thus, to alert a user, in some embodiments, indications about whether contact 202 is already a member/subscriber/account holder of the content management system may be displayed with contact information 202c. For example, a current member/subscriber of the content management system may have their contact information 202c displayed using a lighter font, smaller text size, and/or at a specific position on user interface 200.

In some embodiments, a bolded contact, such as contact 204, may correspond to a contact that is not a member/subscriber/account holder of the content management system, which may be indicated by contact information 204c. Contact information 204c may include the contact's email address, telephone number, mobile phone number, instant message name, other contact information, or any combination thereof. A non-member/subscriber/account holder of the content management system may, for example, have their corresponding contact information displayed using a bolder font, larger text size, and/or at a specific position on user interface 200.

User interface 200 may also include search box 220. Search box 220 may be a text box where a user may enter text and/or search for a contact or a contact's information. For example, a user may search for one or more possible contacts to send a referral request to by inputting some or all of a contact's name into search box 220.

User interface 200 may include invitation button 230 and cancel button 232. In some embodiments, upon selection of one or more check boxes 202a and/or 204a, the user may press invitation button 230 to send the referral request to the one or more checked contacts. However, if a user determines that the selection of contacts made is incorrect, the user can engage cancel button 232 to restart the process, and/or deselect any check boxes 202a and/or 204a which may have been selected.

User interface 200 may also include a graphic indicator. The graphic indicator may display an amount of potential additional storage space available to the user upon acceptance of one or more referral requests sent to one or more selected contacts. In some embodiments, the graphic indicator may be a static icon provided to the user. The static icon may display a specific amount of additional storage space available to the user upon acceptance of a referral request. Or, for example, the graphic indicator may be an animation showing an object moving towards a destination, such as a rocket moving towards a celestial object (e.g., a planet, a moon, etc.), where the object may display some amount of additional storage and the celestial object may display a total amount of additional storage obtainable from all completed referrals. In some embodiments, the graphic indicator may be a "referral slider", such as referral slider 212. Referral slider 212 may be displayed on slider bar 210. Prior to selection of any check boxes (e.g., check boxes 202a and/or 204a), referral slider 212 may show no additional storage space available to the user because no contacts have been selected to send a referral request too. Alternative embodiments, as described below regarding FIG. 3, may display potential amounts of storage space available upon selection of one or more contacts. Once the user selects one or more contacts to send a referral request to, referral slider 212 may move along slider bar 210 corresponding to an amount of potential storage space available to the user should those referees accept the referral request.

Figure 3:
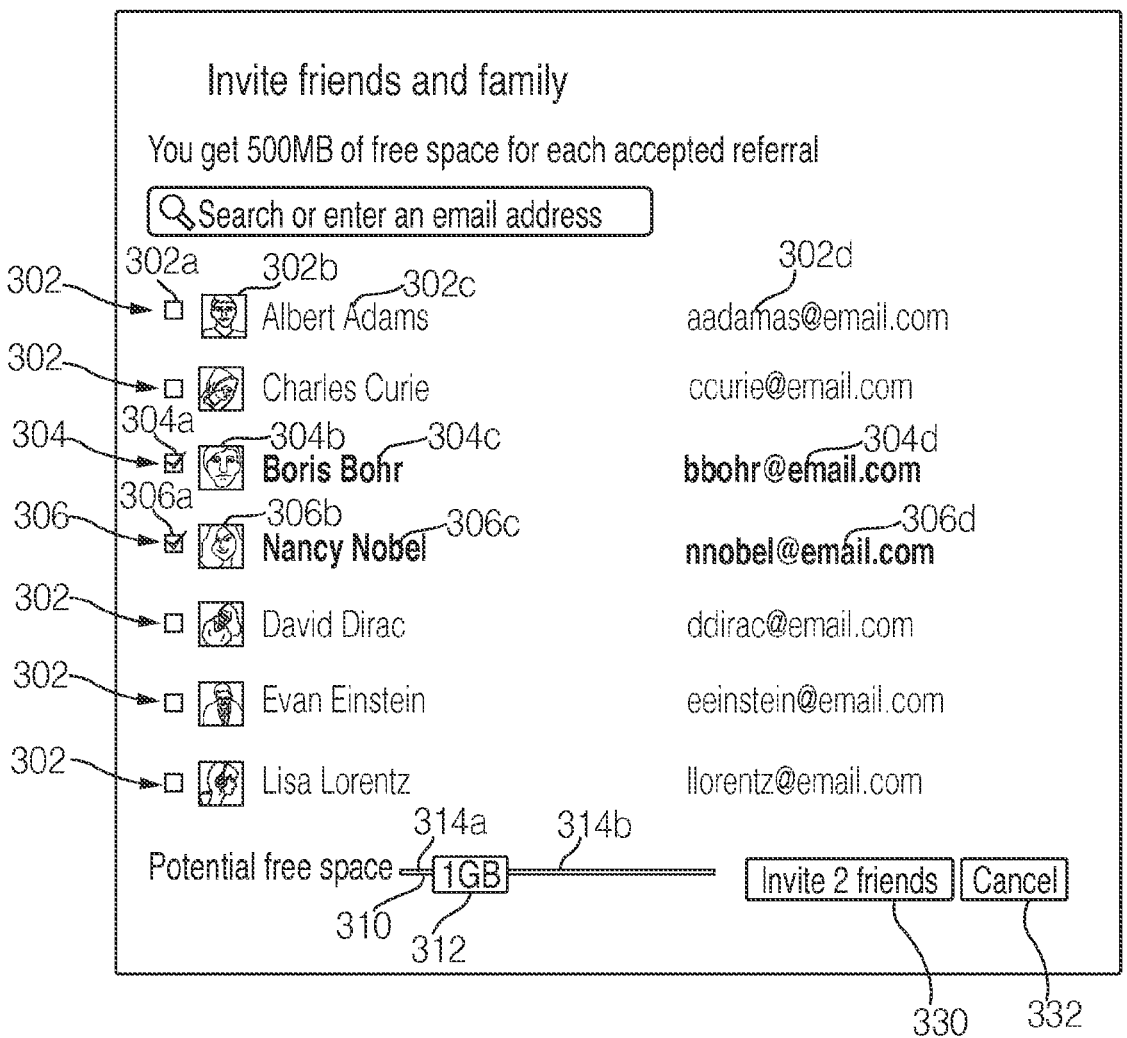
FIG. 3 is an illustrative diagram of a user interface in accordance with various embodiments.

FIG. 3 is an illustrative diagram of user interface 300 in accordance with various embodiments. User interface 300 may include, for example, contacts 302, 304, and 306. Contacts 302, 304, and 306 may include corresponding check boxes, thumbnail images, contact names, and contact information, which may each correspond to a contact associated with a user of a content management system. For example, contact 302 may include check box 302a, thumbnail image 302b, contact name 302c, and contact information 302d. Check box 302a may be any user interface control able to receive an input indicating selection of the associated contact 302. Thumbnail image 302b may be any picture chosen by the associated contact 302, and/or assigned to the associated contact 302 by a user of user interface 300. Contact name 302c may be, for example, a first and/or last name of contact 302, a nickname of contact 302, or any other identifier for contact 302 chosen by contact 302 or by the user. Contact information 302d may be any contact information corresponding to the associated contact 302. For example, contact information 302d may be an email address, a mobile phone number, an instant message name, or any other contact information associated with contact 302, or any combination thereof.

Contacts 304 and 306 may differ from contact 302 by displaying an indication that they have been selected to receive a referral request. For example, a user (e.g., a user viewing user interface 300) may select check boxes 304a and 306a, which may cause a checkmark to appear signifying that contacts 304 and 306 have been selected. In some embodiments, selection of contacts 304 and 306 may cause contact names 304c and 306c, as well as contact information 304d and 306d, to change from a first format to a second format. In the first format, the contact name and contact information may be, for example, in a light font (e.g., not in bold), a smaller font size, and/or in a specific position on user interface 300. For example, contact name 302c and contact information 302d may not be in bold when check box 302a is not selected. In the second format, the contact name and contact information may be in a darker font (e.g., bold), a larger font size, and/or a specific position on user interface 300. For example, contact names 304c and 306c, and contact information 304d and 306d may be in bold when check boxes 304a and 306a have been selected.

User interface 300 may include invitation button 330 and cancel button 332. In some embodiments, a user may provide an input using any suitable mechanism and invoke or press invitation button 330 and/or cancel button 332. For example, once a user has selected contacts 304 and 306 to send referral requests to, invitation button 330 may be pressed and the referral request may be sent. In some embodiments, the referral request may not be sent until invitation button 330 is invoked. In some embodiments, invitation button 330 may dynamically change to display the number of contacts that referral requests may be sent to. For example, if contacts 304 and 306 are selected, invitation button 330 may display "Invite 2 friends." Selection of more or less contacts may similarly trigger invitation button 330 to change the corresponding displayed text. For example, if four contacts are selected invitation button 330 may automatically change to read "Invite 4 friends." Cancel button 332 may, in some embodiments, be used to cancel the referral request process. For example, if a user decides, after making multiple selections, to not send any referral requests, the user may invoke or press cancel button 332 and the process may end without any referral requests being sent. As another example, cancel button 332 may clear any selected check boxes allowing the user to restart the selection process. Although not shown in FIG. 3, in some embodiments, user interface 300 may include a separate clear/unselect button. The user may invoke or press the clear/unselect button and any check boxes that may have been selected, may automatically become unselected.

User interface 300 may also include referral slider 312. Referral slider 312 may display the potential amount of storage space available to a user upon acceptance of one or more referral requests. The amount of additional storage space may depend on the amount of contacts selected to have a referral request sent to and the amount of storage space available per referral request. In some embodiments, an account management module (e.g., account management module 120 of FIG. 1) may determine that for every contact the user refers, a specific amount of additional storage space may be received upon acceptance of the sent referral request. For example, a user may receive 500 MB of additional storage space for every accepted referral request, and if the user selects two contacts to send referral requests, then the user could potentially receive 1 GB of additional storage space. Referral slider 312 may then display the potential amount of additional storage space available to the user (e.g., 1 GB).

Referral slider 312 may be displayed on slider bar 310. As the potential amount of storage space available to the user changes, referral slider 312 may move along slider bar 310. For example, if no contacts are selected (e.g., check boxes 302a, 304a, and 306a are unselected), then referral slider 312 may be at an end of slider bar 310 (e.g., referral slider 212 of FIG. 2). As another example, if a user selects two contacts to send referral requests to (e.g., contacts 304 and 306), and acceptance of each referral request provides the user with 500 MB of additional storage space, then referral slider 312 may be located at a position along slider bar 310 signifying 1 GB of additional storage space which would be potentially available to the user. The use of 500 MB of additional storage space per accepted referral request is merely exemplary, and any amount of storage space may be implemented. Furthermore, any number of clients may be selected to send referral requests to, and the use of two contacts in FIG. 3 (e.g., contacts 304 and 306) is merely exemplary.

As referral slider 312 moves from a first position on slide bar 310 (e.g., a left end) to a second position on slider bar 310 (e.g., a position corresponding to 1 GB of additional storage space), a portion of slider bar 310 to the left of referral slider 312 may also change. For example, as referral slider 312 moves to the right along slider bar 310, portion 314a to the left of referral slider 312 may change to be filled in, a darker color, larger in size, or any combination thereof. Change of portion 314a may signify an amount of storage space that would be available to the user upon the acceptance of the referral request(s). Furthermore, portion 314b to the right of referral slider 312 may remain unchanged until referral slider 312 moves to that portion of slider bar 310. It should be noted that the use of "right" and "left" are merely illustrative, and any orientation of slider bar 310 may be used.

A referral slider may take on many different forms. In some embodiments, the referral slider may reside on a slider bar. For example, referral slider 312 may reside on slider bar 310 of FIG. 3 and may move to different positions along slider bar 310 depending on the amount of additional storage space available to the user upon acceptance of one or more referral requests. Referral slider 312 may also take the form of a fillable bar, fillable pie chart, a dynamically changing color chart, or any other graphic indicator, or any combination thereof.

Figure 4B:
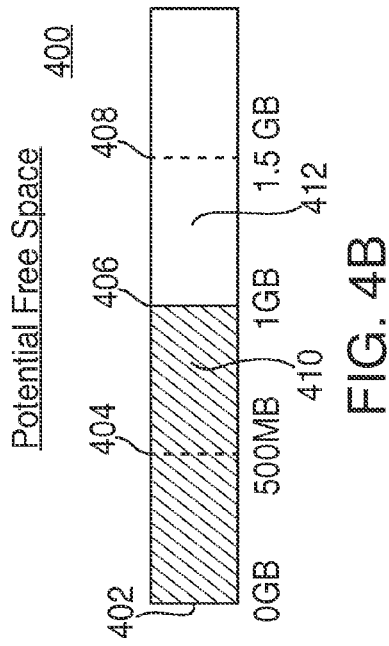
FIG. 4B is an illustrative diagram of a referral slider in accordance with various embodiments.
Figure 4A:
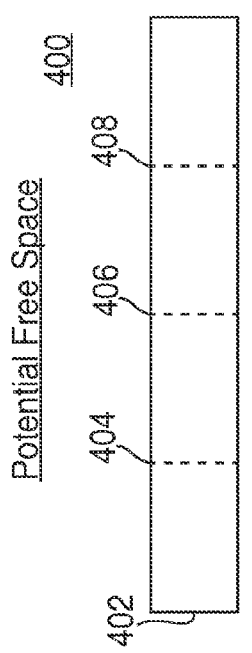
FIG. 4A is an illustrative diagram of a referral slider in accordance with various embodiments.

FIGS. 4A and 4B are illustrative diagrams of referral slider 400 in accordance with some embodiments. In some embodiments, referral slider 400 may be in the form of a fillable bar. FIG. 4A may correspond to referral slider 400 being in a first position prior to any contacts being selected to be sent referral requests. FIG. 4B may correspond to referral slider 400 being in a second position after one or more contacts are selected to have referral requests sent to. Referral slider 400 may include markers 402, 404, 406, and 408, each of which may correspond to certain storage levels. For example, makers 402, 404, 406, and 408 may respectively correspond to storage levels of 0 GB, 500 MB, 1 GB, and 1.5 GB. Markers 402, 404, 406 and 408, however, are merely illustrative, and any storage amount may correspond to any storage marker, and any amount of storage markers may be included. In some embodiments, marker 408 may correspond to a maximum amount of storage space available to the user for sending one or more referral requests. The maximum amount of storage space may be predefined by content management system 100. In some embodiments, the maximum amount of storage available may be modified by the content management system to encompass a user who deserves/requires more storage space for referring more contacts than the current maximum amount of storage space would allot. For example, if the maximum amount of available storage space is 2 GB, a user that refers 10 contacts where each contact would correspond to 500 MB of additional storage space, may have the maximum amount of storage space increased.

Prior to selecting one or more contacts to send a referral request, referral slider 400 may be in the first position. For example, FIG. 4A may display referral slider 400 in an unfilled state when no contacts have been selected (e.g., check boxes 202a of FIG. 2 are not selected). If a user does not select any contacts to send a referral request to, then referral slider 400 may be shown having no potential storage space available to the user (e.g., an unfilled bar).

Once the user selects one or more contacts to send a referral request to, referral slider 400 may be in the second position. For example, FIG. 4B may show referral slider 400 in a filled state including filled region 410 which may correspond to 1 GB of potential storage space available to the user. Filled region 410 may approach marker 406 which may correspond to 1 GB of additional storage space. In some embodiments, for each accepted referral request, a user may receive a certain amount of additional storage space. For example, a user may receive 500 MB of additional storage space per referral request, thus selecting two contacts may display referral slider 400 in a position corresponding to 1 GB of additional storage space potentially available to the user. A user may receive any amount of additional storage space per accepted referral request (e.g., 100 MB, 200 MB, 250 MB, or 1 GB). The amount of storage space available per referral request and the amount of referral requests sent may be factors for determining the filled state of referral slider 400. Unfilled region 412 may correspond to the remaining amount of additional storage space available to the user if additional referral requests are sent to more contacts. For example, if a user selects two contacts to have referral requests sent to, and acceptance of each referral request provides the user with 500 MB of additional storage space, a selection of one additional contact to send a referral request may extend fill region 410 to marker 408, corresponding to 1.5 GB of additional storage space potentially available to the user.

Figure 5B:
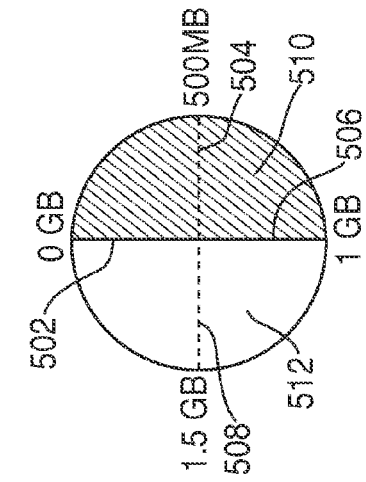
FIG. 5B is an illustrative diagram of a referral slider in accordance with various embodiments.
Figure 5A:
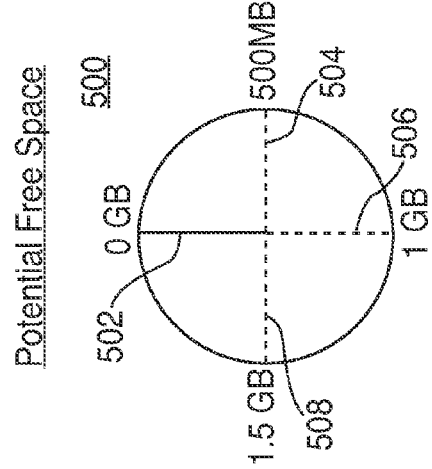
FIG. 5A is an illustrative diagram of a referral slider in accordance with various embodiments.

FIGS. 5A and 5B are illustrative diagrams of referral slider 500 in accordance with some embodiments. In some embodiments, referral slider 500 may correspond to a pie chart. FIG. 5A may correspond to referral slider 500 being in a first position prior to any contacts being selected to be sent referral requests. FIG. 5B may correspond to referral slider 500 being in a second position after one or more contacts are selected to be sent referral requests. Referral slider 500 may be substantially similar to referral slider 400 of FIG. 4, with the exception that referral slider 500 may be a pie chart. Referral slider 500 may also include markers 502, 504, 506, and 508 each of which may correspond to certain storage levels. Markers 502, 504, 506, and 508 may be substantially similar to markers 402, 404, 406, and 408 of FIG. 4 with the exception that markers 502, 504, 506, and 506 may correspond to positions along the pie chart. For example, marker 502 may be at 0-degrees and each subsequent marker may be located at a 90-degree interval. This is merely exemplary, and the position of the 0-degree marker may be at any point along the pie chart as well as the markers may be located at any interval.

Prior to selection of one or more contacts to send a referral request, referral slider 500 may be in the first position. For example, FIG. 5A may show referral slider 500 in an unfilled state. In this example, no contacts may be selected and referral slider 500 may have no region filled in.

Once the user selects one or more contacts to send a referral request, referral slider 500 may be in the second position. For example, FIG. 5B may show referral slider 500 in a partially filled state. In this example, filled region 510 may correspond to 1 GB of storage space being available to the user upon acceptance of one or more referral requests. Filled region 510 may approach marker 506 corresponding to 1 GB. As previously mentioned, the values associated with markers 502, 504, 506, and 508 are merely exemplary, and filled region 510 may correspond to any amount of potential storage space available to the user upon acceptance of one or more referral requests. FIG. 5B may also show unfilled region 512, which may be substantially similar to unfilled region 412 of FIG. 4B, with the exception that unfilled region 512 corresponds to the unfilled region of the pie chart.

FIGS. 4 and 5 show two exemplary embodiments of a referral slider. However, it is understood that many additional embodiments and adaptions of graphic indicators may be implemented. In some embodiments, the graphic indicator may be a color indicator and may change colors depending on the potential amount of additional storage space available to the user. For example, prior to any contacts being selected to send a referral request, the color indicator may be a first color (e.g., white, or light gray). Once a user selects one or more contacts to send referral requests, the color indicator may change to a second color (e.g., yellow, darker gray). The second color may depend on the amount of storage space that would be available to the user upon acceptance of the sent referral request. In some embodiments, as the potential available storage space increases, the color indicator may become increasingly darker. In other embodiments, as the potential storage space increases the color indicator may become lighter.

In some embodiments, the graphic indicator may be a size indicator and may increase in size as the potential amount of additional storage space available to the user increases. For example, prior to any contacts being selected to have referral requests sent to, the size indicator may be a first size. Once a user selects one or more contacts to send the referral request to, the size indicator may change to a second size. The first size may be smaller or larger than the second size. For example, as the potential available storage space increases, the size indicator may increase in size. As another example, as the potential storage space increases, the size indicator may decrease in size.

In some embodiments, one or more of the previous embodiments may be combined with various settings of a user interface. For example, as the amount of potential storage space increase, fill region 410 of FIG. 4 may increase and the background of user interface (e.g., user interface 300 of FIG. 3) may change from a first background to a second background. As another example, as the amount of potential storage space increases, fill region 410 may increase and an audible sound may be provided to the user of the electronic device (e.g., first client electronic device 102a of FIG. 1). In this scenario, as the fill region increases and the referral slider moves from the first position to the second position, a sound may be outputted (e.g., a bell, a ring) corresponding to the amount of potential storage space, where the sound may become progressively louder or progressively softer as the potential amount of additional storage space increases.

Figure 6:
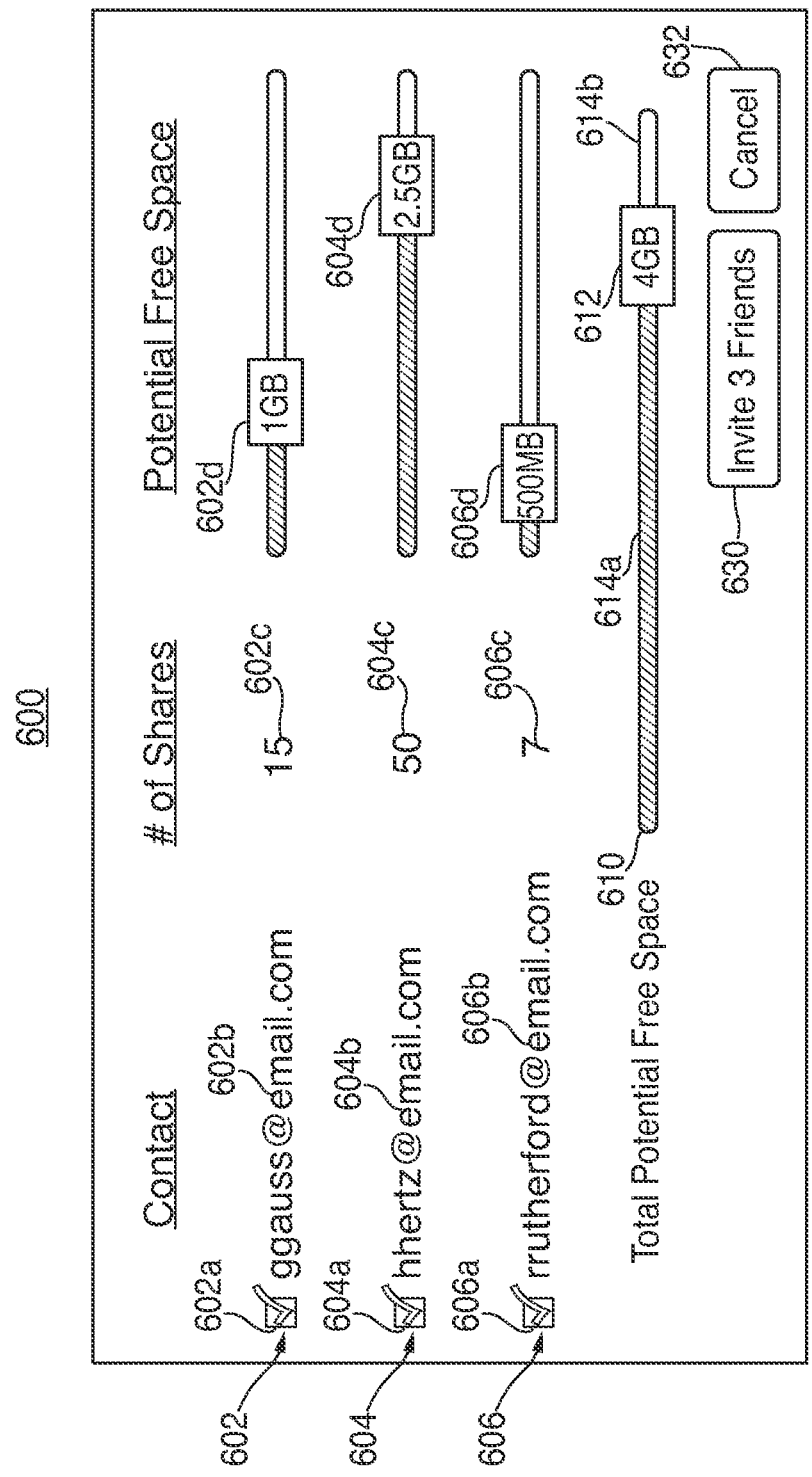
FIG. 6 is an illustrative diagram of a user interface in accordance with various embodiments.

FIG. 6 is an illustrative diagram of user interface 600 in accordance with various embodiments. User interface 600 may include contacts 602, 604, and 606 which may be substantially similar to contacts 302, 304, and 306 of FIG. 3, and the previous description of the latter may apply to the former. Contact 602 may include check box 602a, contact information 602b, content share information 602c, and referral slider 602d. Contact 604 may include check box 604a, contact information 604b, content share information 604c, and referral slider 604d. Contact 606 may include check box 606a, contact information 606b, content share information 606c, and referral slider 606d.

In some embodiments, a user accessing user interface 600 may have a share history of sharing content with contact 602 represented by content share information 602c. Content share information 602c may indicate that contact 602 has been the frequent recipient or provider of shared content with the user. The user may receive a bonus amount of additional storage space upon the acceptance of a referral request sent to a contact (e.g. contact 602) based on share information (e.g. content share information 602c). A user may share content with contact 602 who may be accessible via contact information 602b. An example of content sharing is provided in U.S. patent application Ser. No. 13/888,157, entitled "Managing Shared Content with a Content Management system," filed on May 6, 2013, which claims the benefit of U.S. Provisional Patent Application No. 61/801,138, entitled "Managing Shared Content with a Content Management System," filed on Mar. 15, 2013, both of which are incorporated herein by reference in their entirety. Contact 602 may be any contact with whom the user accessing user interface 600 may have frequently shared content with. For example, a user may have shared content with contact 602 fifteen (15) times. Sharing content with a contact this many times may cause a referral slider related to contact 602, such as referral slider 602d, to be displayed in a position indicating an amount of storage space available to the user upon acceptance of a referral request sent to contact 602.

The amount of times a contact has been the recipient of shared content may affect the amount of storage space available to the user upon acceptance of a referral request sent to that contact. For example, the user of user interface 600 may have frequently shared content with contact 602, and content share information 602c may depict the number of times that content has been shared between contact 602 and the user (e.g., 15 times). Based on the frequency of content sharing or the share history with contact 602, a certain amount of storage space may be available to the user upon acceptance of a referral request sent to contact 602 (e.g., 1 GB of storage space), and this amount of storage space may be displayed with referral slider 602d.

The frequency with which a user shares content with a contact may be a factor for determining the amount of potential free space available to the user upon acceptance of a referral request sent to the frequent contact. For example, if the user shared content with contact 602 fifteen (15) times, a first amount of additional storage space may be available, whereas if user shares content with contact 604 fifty (50) times a second amount of potential storage space (generally larger) may be available. Referral sliders 602*d* and 604*d* may display first and second amounts of storage space available to the user upon acceptance of referral requests respectively sent to contacts 602 and 604. As another example, the user may have shared content with contact 606 seven (7) times, and the potential storage space available to the user upon acceptance of a referral request sent to contact 606 may be less than that which corresponds to contact 602 and/or contact 604 as a result.

As noted above, the frequency with which a user shares content with a specific contact may affect the potential amount of storage space available to that user upon the acceptance of a referral request sent to that contact. In some embodiments, the numbers of times that content has been shared and the amount of storage space available to the user for sharing certain numbers of times may be determined and/or defined by the user, and/or the system. For example, the greater the frequency of sharing between the user and a specific contact, the more the storage space potentially available to the user may be. If a user shares content with a specific contact more than a first amount of times (e.g., ten or more shares), then a first amount of storage space may be available to the user upon acceptance of a referral request sent to that specific contact. For example, sharing content with a contact between 10 and 20 times may correspond to 1 GB of additional storage space available to the user. Furthermore, if a user shares content with a specific contact more than a second amount of times (e.g., 25, 30, 40, 50 or more shares), then a second amount of storage space may available to the user upon acceptance of a referral request sent to that specific contact. For example, sharing content with a contact 50 times may correspond to 2.5 GB of additional storage space available to the user. If a specific contact (e.g., contact 606) has not been the recipient of shared content more than a third number of times (e.g., less than ten (10) shares), then that contact may not be classified as a frequent contact, and acceptance of a referral request sent to that contact may result in a default amount of storage space being available to the user. For example, sharing content with a contact less than 10 times may correspond to 500 MB of available storage space, which may be substantially similar to the amount of potential storage space available in relation to a referral request sent to a contact with one or no previous shares.

Each of contacts 602, 604, and 606 may have had content shared with them a certain amount of times (e.g., content share information 602*c*, 604*c*, and 606*c*). User interface 600 may thus display a referral slider for each contact to indicate the potential amount of storage space available to the user upon acceptance of a referral request sent to the corresponding contact. For example, the user may have shared content with contact 602 fifteen (15) times, and sharing content with the same contact fifteen times may provide 1 GB of additional storage space to the user. Referral slider 602*d* may be displayed on user interface 600 to indicate to the user the potential amount of space available upon acceptance of the referral request sent to contact 602. Similarly, the user may have shared content with contact 604 fifty (50) times, and sharing content with the same contact fifty times may potentially provide 2.5 GB of additional storage space to the user. Referral slider 604*d* may be displayed to the user of user interface 600 to indicate the potential amount of space available to the user upon acceptance of the referral request sent to contact 604. Additionally, the user may have shared content with contact 606 seven (7) times, and sharing content with the same contact seven times may potentially provide 500 MB of storage space to the user. Referral slider 606*d* may be displayed to the user of user interface 600 to indicate the potential amount of storage space available to the user upon acceptance of the referral request sent to frequent contact 606.

Referral sliders 602*d*, 604*d*, and 606*d* may, in some embodiments, be adjustable, and the adjustments may be provided by the content management system. For example, a content management system (e.g. content management system 100 of FIG. 1) may determine the amount of potential storage space available to a user based on the number of times content may have been shared by that user with a contact. In some embodiments, referral sliders may be dynamically adjustable. For example, a certain contact may receive more and more shared content, and an amount of storage space available to the user upon acceptance of a referral request sent to that contact may automatically change corresponding to the additional amount of shared content. The change may be displayed in real time by a referral slider (e.g., referral slider 602*d*), as each additional share occurs.

User interface 600 may also include total referral slider 612. Total referral slider 612 may be a cumulative referral slider displaying to the user the total amount of free space available upon acceptance of a referral request sent to each of the selected contacts (e.g., contacts 602, 604, and 606). For example, if a user selects to send a referral request to contact 602, the user may select check box 602*a*, and total referral slider may change from a first position to a second position corresponding to a first amount of additional storage space available to the user displayed by referral slider 602*d*. Similarly, the user may also select contacts 604 and 606 by selecting check boxes 604*a* and 606*a*, and total referral slider 612 may change from being in the second position to a third position corresponding to a second amount of additional storage space available to the user displayed by referral sliders 604*d* and 606*d*. For example, referral requests sent to contacts 602, 604, and 606 may each provide 1 GB, 2.5 GB, and 500 MB of additional storage space to the user. Total referral slider 612 may then display the aggregate amount of additional storage space for each contact (e.g., 4 GB).

Total referral slider 612 may be any referral slider or graphic indicator. Total referral slider 612 may be the same type of referral slider as referral sliders 602*d*, 604*d*, and/or 606*d*. However, in some embodiments total referral slider 612 may differ from referral slider 602*d*, 604*d*, and/or 606*d*, and may be any type of graphic indicator (e.g., fillable bar 400 or pie chart 500). In some embodiments, total referral slider 612 may reside on slider bar 610. As total referral slider 612 changes positions corresponding to the total amount of additional storage space available to the user, a first region 614*a* (e.g., the region to the left of total referral slider 612) may be in a first state (e.g., filled in, darkened, or a certain color). A second region 614*b* may correspond to the region to the right of total referral slider 612, and may represent the potential amount of storage space still available to the user if more contacts are selected to send referral requests to. Second region 614*b* may be a second state (e.g., unfilled, lightened, or a certain color). A user may choose to invite the one or more selected contacts (e.g., contacts 602, 604, and/or 606) by pressing invitation button 630 (which may be substantially similar to invitation button 330 of FIG. 3) and the previous description of the latter may apply to the former. Similarly, a user may choose to cancel the referral process by invoking or pressing cancel button 632 (which may be substantially similar to cancel button 332 of FIG. 3, and the previous description of the latter may apply to the former).

Figure 7:
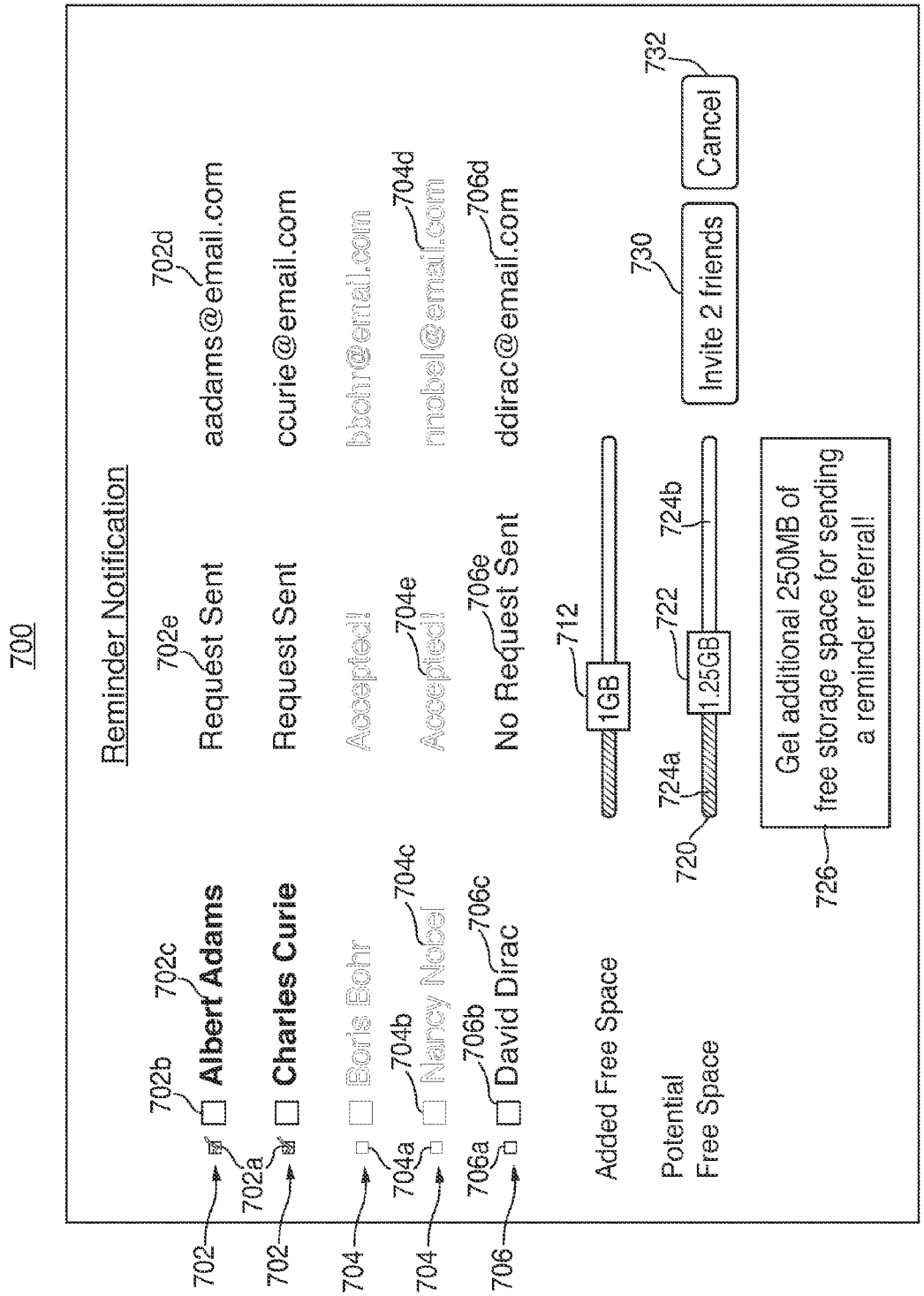
FIG. 7 is an illustrative diagram of a user interface in accordance with various embodiments.

FIG. 7 is an illustrative diagram of user interface 700 in accordance with various embodiments. User interface 700 may include contacts 702, 704, and 706 which may correspond to various contacts that have previously been sent a first referral request. Contacts 702, 704, and 706 may include check boxes 702a, 704a, and 706a, thumbnail images 702b, 704b, and 706b, contact names 702c, 704c, and 706c, and contact information 702d, 704d, and 706d, respectively (which may be substantially similar to respective check boxes 302a, 304a, and 306a, thumbnail images 302b, 304b, and 306b, contact name 302c, 304c, and 306c, and contact information 302d, 304d, and 306d of FIG. 3, as described above).

Contacts 702, 704, and 706 may also include referral status information 702e, 704e, and 706e, respectively. In some embodiments, referral status information 702e, 704e, and 706e may correspond to the current status of a first referral request previously and/or currently sent to contacts 702, 704, and/or 706. For example, contacts 702, 704, and 706 may previously been sent a first referral request, but only contacts 704 may have accepted the first referral request. Referral status information 704e may display a notification to the user of user interface 700 indicating that contacts 704 have accepted the first referral request. For example, referral status information 704e may include a phrase such as "Accepted!" indicating that contacts 704 may have accepted the first referral request. As another example, if one or more contacts have accepted a referral request, then those contacts may have at least one of their check box, thumbnail image, contact name, contact information, and/or referral status grayed or blacked out.

Once contacts 704 have accepted the first referral request, as indicated by referral status information 704e, a first referral slider 712, corresponding to the added free space provided to the user, may be displayed on user interface 700. In some embodiments, for each referral request a user sends to a contact, a certain amount of additional storage space may be available to the user upon acceptance of the referral request. For example, for each accepted referral request, a user may be provided with 500 MB of additional storage space. Continuing with this example, because two contacts (e.g., contacts 704) accepted the first referral request, the user may be provided with 1 GB of additional storage space. The first referral slider 712 displayed on user interface 700 may indicate the amount of additional storage space added to the user's account.

Although some contacts may accept the first referral request (e.g., contacts 704), some may not. In some embodiments, if the first referral request is not accepted, the user may send a second referral request to some or all of the remaining contacts (e.g., contacts 702) and additional storage space may be provided to the user upon acceptance of the second referral request. For example, contacts 702 and 706 may have been sent a first referral request (e.g., the same first referral request that contacts 704 accepted) but may not have accepted. The user who sent the first referral request may receive notification that some contacts (e.g., contacts 702 and 706) have not accepted the first referral request. The user may then decide to send one or more additional referral requests to one or more of the contacts that did not accept the first referral request. For example, contacts 702 may be sent a second referral request, and referral status indicator 702e may display an indication to the user that a second request has been sent. Continuing with this example, contacts 706 may not be sent a second referral request, and referral status indicator 706e may display an indication to the user that no additional request has been sent.

Once one or more contacts 702 are selected for a second referral request, a second referral slider 722, corresponding to an amount of additional storage space available to the user upon acceptance of the second referral request, may be displayed to the user. In some embodiments, the second referral slider 722 may move from a first position to a second position corresponding to the amount of additional storage space available to the user upon acceptance of the second referral request. Second referral slider 722 may be substantially similar to referral slider 312 of FIG. 3 with the exception that referral slider 722 may correspond to the amount of additional storage space available to the user upon acceptance of a second referral request sent to one or more contacts (e.g., contacts 702).

In some embodiments, a bonus amount of additional storage space may be provided to the user for sending the second (or "reminder") referral request. For example, if a user sends a first referral request to four contacts and only two accept, the user may be provided with user interface 700 to send a second referral request to the two contacts who did not accept the first referral request. In addition to the additional storage space available to the user upon acceptance of the second referral request, the act of sending the second referral request may provide the user with a bonus amount of additional storage space as indicated by message 726. For example, if a user sends a second referral request, the user may be provided with 250 MB of bonus storage space in addition to the amount of additional storage space available upon the acceptance of the second referral request.

Second referral slider 722 may be substantially similar to first referral slider 712 with the exception that second referral slider 722 may correspond to the potential amount of storage space available to the user upon acceptance of the second referral request, as well as a bonus amount of storage space available to the user for providing a second referral request. Second referral slider 722 may include, for example, slider bar 720, first portion 724a, and second portion 724b (which may be substantially similar to slider bar 310, first portion 314a, and second portion 314b of FIG. 3 and the previous description of the latter may be applied to the former). In some embodiments, once a user selects one or more contacts for the second referral request, second referral slider 722 may move from a first position to a second position along slider bar 720. For example, a user may select two contacts (e.g., contacts 702) for a second referral request, where each accepting contact corresponds to 500 MB of additional storage space available to the user (e.g., two contacts corresponding to 1 GB). Additionally, for sending the second referral request, the user may be provided with a bonus amount of storage space (e.g., 250 MB). Continuing with this example, second referral slider 722 may move from a first position to a second position, where the second position may correspond to the aggregate of the bonus amount of storage space and the additional amount of storage space available to the user upon acceptance of the second referral request.

Figure 8:
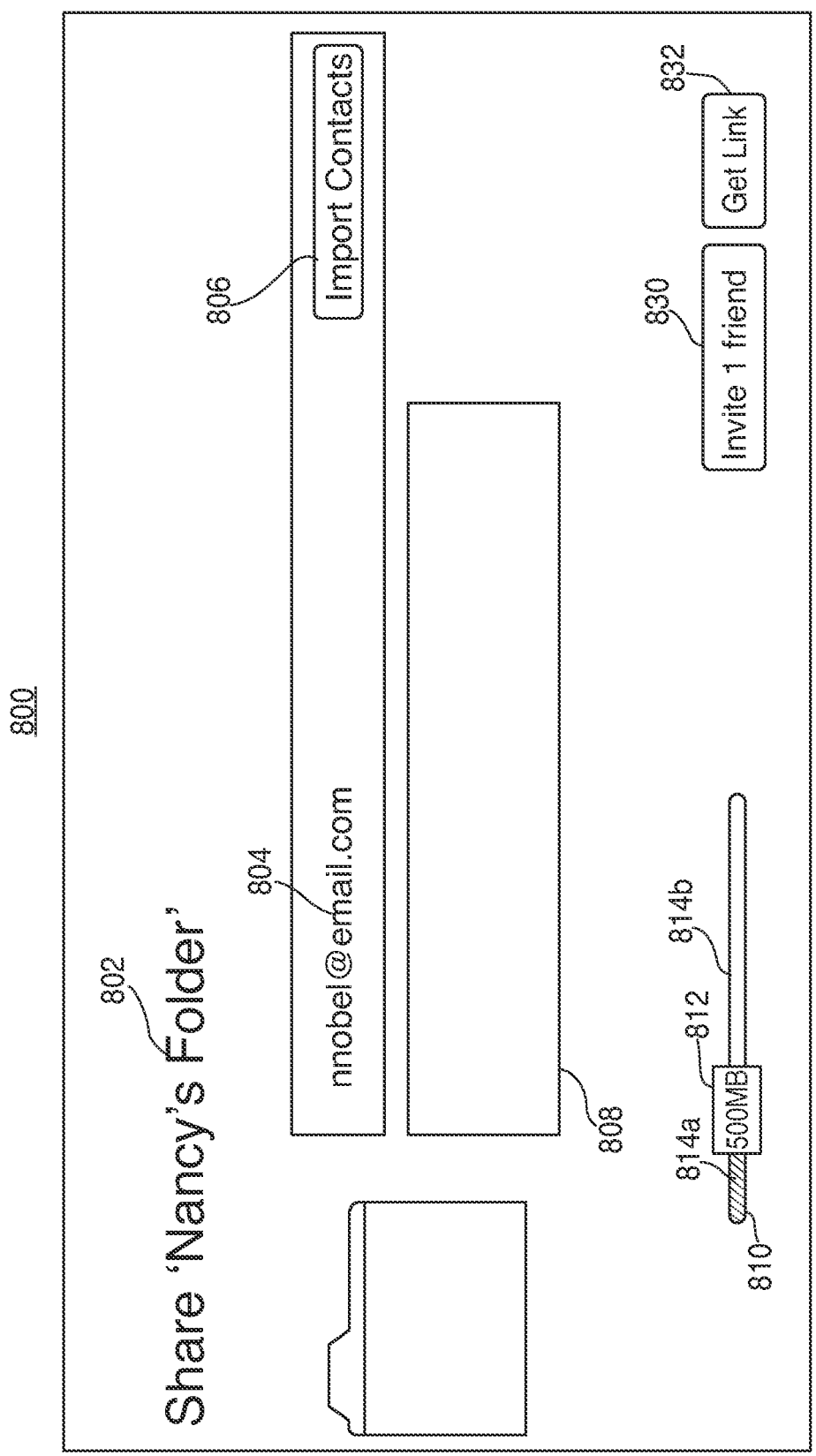
FIG. 8 is an illustrative diagram of a user interface in accordance with various embodiments.

FIG. 8 is an illustrative diagram of a user interface in accordance with various embodiments. User interface 800 may be provided to a user upon selection of one or more files or folders to be shared. A user may select a file 802 to share with one or more contacts. In some embodiments, file 802 may be a folder including multiple files. In other embodiments, file 802 may be a single file.

Once a user selects which file 802 to share, the user may be prompted by user interface 800 to input one or more contacts to share file 802 with. In some embodiments, the user may enter contact names and/or contact information (e.g., email addresses) into text box 804. In some embodiments, text box 804 may be a search box which may search through one or more databases located on a user device, and/or a content management system. A user may enter a name of one of the user's contacts into text box 804. The name may be searched on one or more databases located on the user's device and/or a content management system with which the user has an account. If discovered, some or all of the contact's information may be used in text box 804. For example, a user typing the name of a contact with which the user frequently shares content may be a contact stored in a content management system with which the user has an account. If the contact is indeed one of the user's contacts, then once the user begins to type the name the user may be prompted to use a corresponding email address to send the shared file. In some embodiments, text box 804 may be a drop down menu. For example, a button may be pressed to have a list of the user's contacts displayed and the user may select one or more contacts from the drop down menu to send the shared file.

If, however, the contact is not a one of the user's contacts, the user may import the contact by pressing import contact button 806. For example, a user may type an email address into text box 804. In some embodiments, text box 804 may be a search box and may search for the contact's email address in one or more databases to determine whether the email address corresponds to one of the user's contacts. If the email address does not correspond to one of the user's contacts, the user may select button 806 to import the email address to a list of the user's contacts. In some embodiments, the user may be asked to input additional information corresponding to the email address. For example, the user may be asked to input the name of the contact associated with the email, a mobile phone number associated with the email, one or more social media profiles associated with the email, a thumbnail image associated with the email, or any other additional information, or any combination thereof.

In some embodiments, user interface 800 may also include message box 808. Message box 808 may be any text box capable of allowing a user to type a message to one or more contacts who may receive shared file 802. For example, a user may be sharing a document with a contact, and may write a message to the contact describing details corresponding to the shared document. In some embodiments, message box 808 may allow a user to send URL links, pictures, and/or videos.

User interface 800 may also include referral slider 812. Referral slider 812 may be substantially similar to referral slider 312 of FIG. 3 with the exception that referral slider 812 may correspond to an amount of storage space available to the user upon sending a referral request to one or more imported contacts. For example, a user may decide to share a file 802 with a new contact, and may type the contact's information into text box 804. If the contact information does not correspond to any of the user's existing contacts, then the user may be provided with an option to import the new contact into the user's contact list by pressing import button 806. Referral slider 812 may be display to the user an amount of storage space that may be available to the user upon acceptance of a referral request sent to the new contact to join content management system 100.

In some embodiments, a certain amount of storage space per referral request may be displayed with referral slider 812. For example, a user may be provided with 500 MB of storage space per accepted referral request, and referral slider 812 may display to the user the potential amount of storage space that will be available to the user upon acceptance of the sent referral request. Referral slider 812 may reside on slider bar 810, and may also include portions 814*a* and 814*b* which may be substantially similar to slider bar 310, and portions 314*a* and 314*b* of FIG. 3, and the previous description of the latter may apply to the former.

In some embodiments, user interface 800 may include invitation button 830 and "Get Link" button 832. Invitation button 830 may be substantially similar to initiation button 330 of FIG. 3. Get Link button 832 may be a button that generates a URL link corresponding to shared file 802. For example, instead of sending one or more referral requests which may include shared file 802, a user may press get link button 832 to generate a URL link. Once the user has the URL link, the user may choose to send the URL link via an email, a SMS message, over an instant message, or by any other communication means, in order to share file 802.

Figure 9:
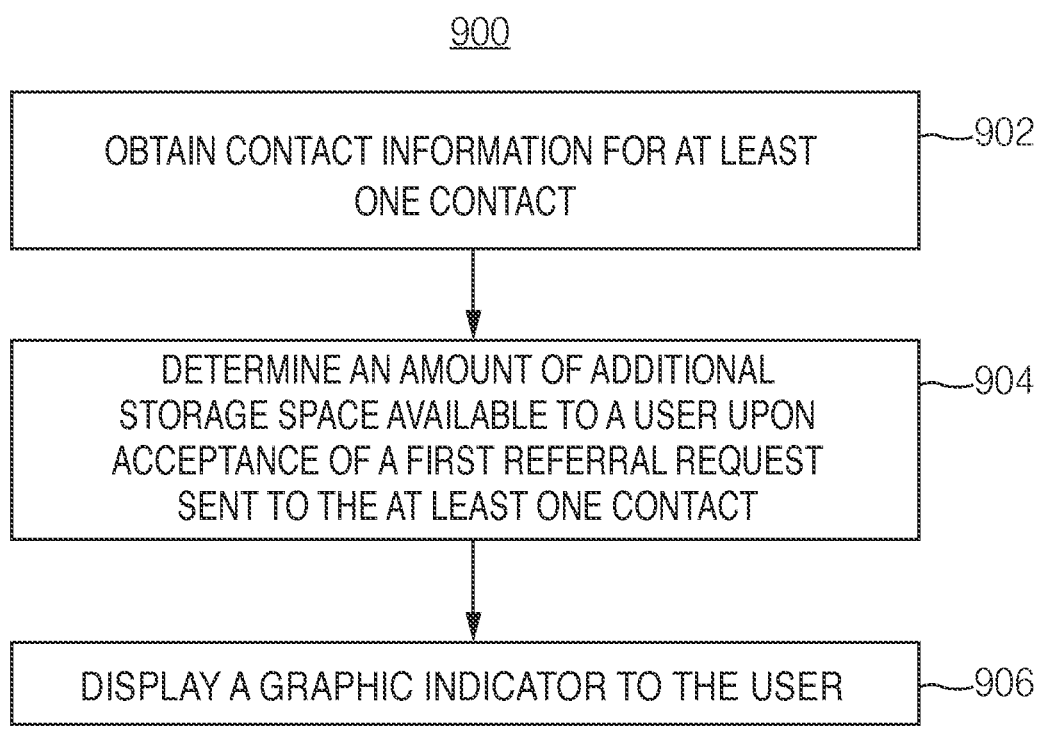
FIG. 9 is an illustrative flow chart of a process in accordance with various embodiments.

FIG. 9 is an illustrative flow chart of process 900 in accordance with some embodiments. At step 902, contact information for at least one contact associated with a user and/or a user account of a content management system may be obtained. For example, contact information may be obtained by accessing contact information on a client device, and/or stored information on the content management system. As another example, contact information may be obtained from third party applications, contacts stored locally on the client device, contacts stored within the contact management system (e.g., a history of contacts shared content with or that contacts have shared with, contacts with some affinity to user or account), email applications, and/or social networks. Contact information may also be obtained with operating system interface function calls, request information from third party application with interface function calls and/or a user may be prompted to enter contact information; or expand on information available from content management system.

Contact information for the at least one contact may include a contact's email address, a mobile phone number, an instant message handle, social media network and/or profile handle, or any other piece of contact information, or any combination thereof. Examples of contacts may include phone contacts, email contacts, social media contacts and friends, and/or any other third party application contacts. In some embodiments, the user may be prompted to grant access to a particular database of contacts, and/or third-party application for access to contact information.

At step 904, an amount of potential additional storage space available to the user upon acceptance of a first referral request may be determined. For example, a default amount of storage space may be defined that is available for an account on a per contact basis. For example, for every contact that accepts a referral request, a user may be provided with 500 MB of additional storage space. Thus, if a user selected two contacts to send a referral request to, 1 GB of additional storage space may be available to the user upon acceptance of the referral request. In some embodiments, the amount of storage space may be configured by the user. For example, the user may determine a specific amount of storage space per referred contact and/or a maximum amount of storage available to the user. In some embodiments, both the content management system and/or the user may configure the first amount of storage space. For example, a user may request a certain amount and the system may accept or reject the user's request.

In some embodiments, the amount of storage space may be calculated by a content management system, such as content management system 100 of FIG. 1. For example, a specific amount of storage space (e.g., 500 MB) may be available to the user per referred contact and/or a maximum amount of storage available to the user may be calculated. The specific amount of storage space may be calculated based on various factors. For example, factors may include common domain, likelihood of acceptance, common contacts, content share history, or any other factor, or any combination thereof.

At step 906, a graphic indicator may be displayed indicating the amount of additional storage space, each of the user's current storage space and the amount of additional storage space, and/or the relative quantities of the user's current storage space the amount of additional storage space. In some embodiments, an icon may presented to the user indicating the amount of additional storage space. For example, a static icon may be presented indicating a fixed amount of storage space available to the user. As another example, the graphic indicator may be an animation showing an object moving towards a destination, such as a rocket moving towards a celestial object (e.g., a planet, a moon, etc.), where the object may display some amount of additional storage and the celestial object may display a total amount of additional storage obtainable from all completed referrals. In some embodiments, the graphic indicator may be a referral slider. For example, a referral slider (e.g., referral slider 312 of FIG. 3) may display the potential amount of storage space available to the user (e.g., 1 GB) upon acceptance of a referral request sent to one or more contacts (e.g., contacts 304 and 306 of FIG. 3). As another example, a first referral slider, such as first referral slider 712 of FIG. 7, may be displayed to convey a user's current amount of storage space, and a second referral slider, such as second referral slider 722 of FIG. 7, may display a user's potential amount of additional storage space.

The referral slider, such as referral slider 312 of FIG. 3, may be any graphic indicator capable of displaying to a user, such as a user of first or second client electronic device 102*a* or 102*b* of FIG. 1, the potential amount of storage space available to the user upon the acceptance of one or more referral requests. For example, the referral slider may be a tab displayed to appear as though a slider moves along a slider bar (e.g., slider bar 310 of FIG. 3), a moveable line, a color indicator capable of changing form a first color to a second color, a rectangle with a filled segment (e.g., filled region 406 of referral slider 400 of FIG. 4), a pie chart, or any other suitable referral slider or graphic indicator, or any combination thereof.

In some embodiments, the referral slider may be displayed to indicate each time additional contact information is received. For example, if a user, such as a user of a first client electronic device 102*a* of FIG. 1, adds a new contact to the user's contacts, the referral slider may be updated to indicate the amount of additional storage space available to the user upon acceptance of a referral request sent to the new contact that was added to the user's contacts. Updating the referral slider may correspond to moving or repositioning the referral slider from a first position to a second position. The first position may correspond to the amount of available storage space prior to adding the new contact to the user's contacts, and the second position may correspond to the amount of available storage space after adding the new contact. Updating the referral slider may correspond to adding a filled segment to a bar chart, such as filled-in region 410 of FIG. 4, a change in color of the color indicator from a first color to a second color, and/or any other way to visually convey an update to the referral slider and/or graphic indicator. For example, prior to adding a new contact to the user's contacts, the referral slider may be a light color (e.g., yellow). After adding the new contact, the color indicator may change to be a darker color (e.g., green). As another example, adding the new contact to the user's contact may cause a size indicator to increase from a first size to a second size.

In some embodiments, the user may be prompted to add additional contact information. For example, a user may receive an email, phone call, and/or text message from a new contact and the user may be prompted to add the new contact to the user's contact list. The referral slider may display the potential storage space available to the user upon acceptance of a referral request and/or allowing a request to be sent to the new contact. In some embodiments, the user may be prompted (e.g., on first client electronic device 102*a* of FIG. 1) to allow a search for contact information within locally stored data on a device and/or stored by third party applications. If any new or recently added contacts are found, their contact information may be obtained and an amount of additional storage space may be determined and displayed to the user using a graphic indicator (e.g., referral slider 312 of FIG. 3). In some embodiments, an email application database may be accessed for additional contact information. For example, a user may only have a name or a picture of a contact stored in memory on a user's device and/or on a content management system (e.g., Random Access Memory (RAM), Read Only Memory (ROM), etc.). A request may be sent to the email application to access contact information and add additional contact information to supplement or update the contact's information.

In some embodiments, determining the amount of additional storage space may include determining at least one common factor associated with the at least one contact. A second amount of additional storage space available to the user as a function of the common factor may be provided upon the acceptance of the first referral request sent to the at least one contact. The common factor may be a common email domain name. For example, if a user went to a specific university, a user may have a student email address ending in @university.edu. A user's contacts may be searched to determine if any of the user's contacts also have an email address ending in @university.edu. The user may be provided with additional storage space by sending one or more referral requests to any of the user's contacts having the common email domain name, and these contacts accepting the sent referral request. As another example, a user's social media account may be accessed to obtain one more contacts to send a referral request. As yet another example, a common factor may be a contact with which content is frequently shared.

In some embodiments, a second referral request may be sent to any of the contacts who did not accept the first referral request. An additional amount of storage space may be available to the user upon acceptance of the second referral request. For example, a user may have sent a first referral request to contacts 702, 704, and 706 of FIG. 7. However, of contacts 702, 704, and 706, only some contacts may accept the first referral request (e.g., contacts 704). The user may send a second referral request to some of the contacts who did not accept the first referral request (e.g., contacts 702) and an additional amount of storage space may be available to the user upon the acceptance of the second referral request. In some embodiments, the additional amount of storage space may include a bonus amount of storage space in addition to the additional amount of storage space per referred contact, because the user sends the second referral request. For example, sending a second referral request may provide 250 mb of bonus storage space.

In some embodiments, at least one frequent contact of the user may be defined and an additional amount of storage space may be available to the user upon the acceptance of a referral request sent to the at least one frequent contact. For example, some contacts may be frequent recipients of shared content (e.g., contacts 602, 604, and 606 of FIG. 6). In some embodiments, the amount of additional storage space available to the user upon the acceptance of the referral request may depend on the frequency with which content is shared with that contact. For example, contact 602 and contact 604 of FIG. 6 may have had content shared with them by the user fifteen (15) times and fifty (50) times, respectively. A content management system, such as content management system 100 of FIG. 1, may determine that a contact who has had content shared with them more than ten (10) times but less than twenty (20) times (e.g., contact 602) may correspond to a first amount of additional storage space (e.g., 1 GB) available to the user upon acceptance of a referral request sent to that contact. Additionally, the content management system may determine that a contact who has had content shared with them more than twenty five (25) times (e.g., contact 604), may correspond to a second amount of additional storage space (e.g., 2.5 GB) available to the user upon acceptance of a referral request sent to that contact. Continuing with these examples, one or more referral sliders (e.g., 602d, 604d) may be displayed to the user indicating the potential amount of storage space available to the user upon acceptance of the referral request(s) sent to the contact(s) (e.g., contacts 602 and 604).

In some embodiments, the graphic indicator may include a pop-up notification that may be provided on a user's device. For example, as a user selects one or more contacts to send referral requests, a referral slider may "pop-up" on a user's device (e.g., first client electronic device 102a of FIG. 1), displaying the potential amount of storage space that may be available to the user upon acceptance of the referral request.

In some embodiments, a capacity level of the storage space available to the user may be detected. For instance, if it is determined that the user is using more than a defined fraction of the capacity level then additional storage space may be provided to the user, and notification of the additional storage space to be provided may be displayed to the user. For example, a user may have capacity for a certain amount of storage space (e.g., 5 GB). Once a user reaches a certain capacity level, for instance 90% full (e.g., 4.5 GB used), the user may be provided with a notification indicating that 90% of the user's storage space has been filled. The user may then be provided with an option to receive additional storage space (e.g., 5 GB), and a notification that the user's capacity level may change from 90% full to 45% full may be displayed using a graphic indicator (e.g., a referral slider). In some embodiments, the provided additional storage space may be purchased from a content management, and/or may be provided to the user by referring one or more additional contacts.

In some embodiments, a share history corresponding to at least one contact associated with the user may be retrieved. Once retrieved, the share history may be analyzed to determine a selection of contacts to send a referral request. For example, a contact may be identified who may be associated with the user who also may have an account with the content management system. A sharing history for the associated contact may be retrieved using any module located on the user and/or associated contact's device (e.g., sharing modules 152). Potential contacts for referrals may be determined from the retrieved sharing history of the associated contact. The share history of the associated contact may be analyzed to determine frequency of communication with other contacts with whom content may have been shared with, contacts with common email domain names as the associated contact, contacts with whom the associated contact may be connected to with one or more social media networks, or any other pertinent sharing factors, or any combination thereof.

Figure 10:
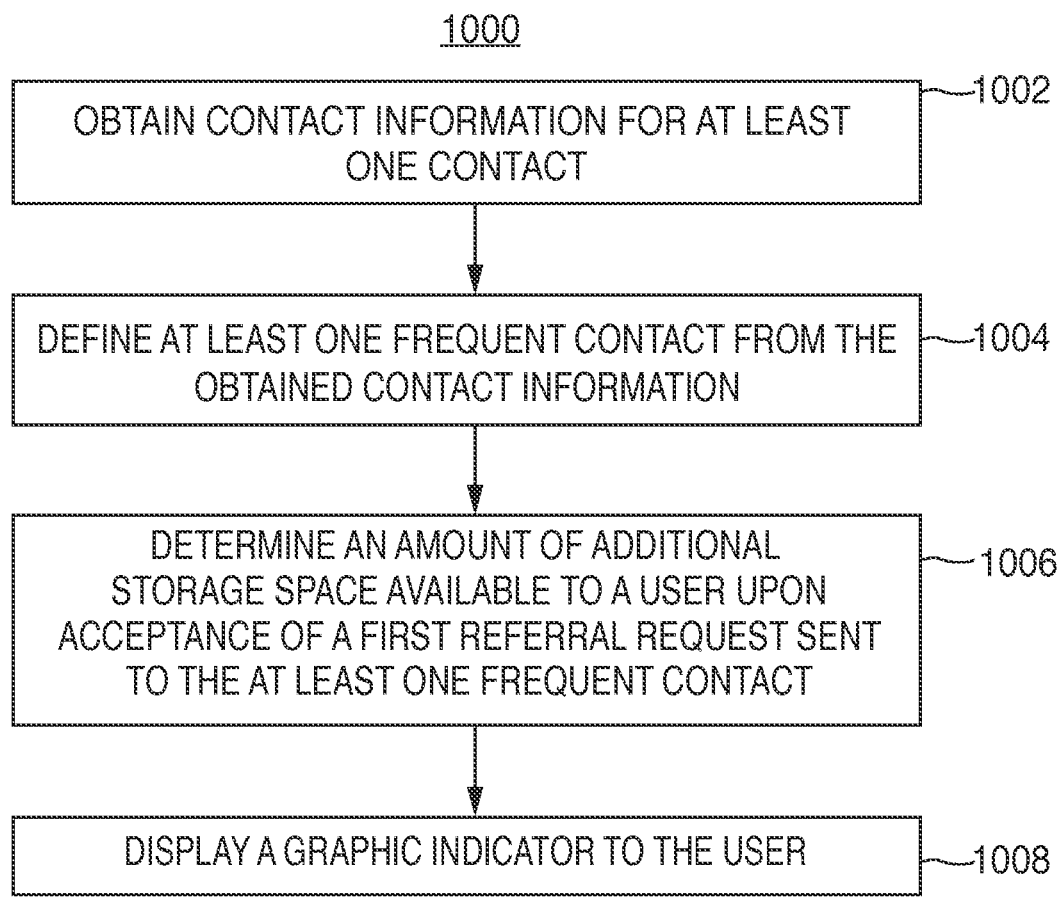
FIG. 10 is an illustrative flowchart of a process in accordance with various embodiments.

FIG. 10 is an illustrative flowchart of process 1000 in accordance with some embodiments. Process 1000 may begin at step 1002. At step 1002, contact information for at least one contact associated with a user of a content management system may be obtained. For example, a user of a first electronic device (e.g., device 102a of FIG. 1) may obtain contact information pertaining to a contact associated with the user by accessing contact information on a second electronic device (e.g., device 102b), accessible or stored for with the content management system, and/or accessible by the user. Contact information may include email addresses, mobile phone numbers, instant message names, or any other piece of contact information, or any combination thereof. The contact information may be obtained from the user's contacts. The user's contacts may include the user's phone contacts, email contacts, social media contacts and friends, and/or any other third party application contacts. Contact information may also be obtained with operating system interface function calls, request information from third party applications with interface function calls, and/or a user may be prompted to enter contact information; or expand on information available from the content management system. In some embodiments, the user may be prompted to grant access to the user's contacts.

At step 1004, at least one contact may be in frequent communication with the user. The frequent communication between the at least one contact and the user may be determined from the communication history between the user and the at least one contact. For example, a user who communicates with a contact via telephone, SMS messaging, email, or using any other communication means, or any combination thereof, may be classified as a contact with which the user has frequent communication.

In some embodiments, the contact may be a contact with whom the user has shared content with at least a first number of times. In some embodiments, the first number of times may be set by the content management system. In other embodiments, the first number may be set by the user prior to sharing with the contact. For example, the first number may be ten (10) shares, twenty (20) shares, thirty (30) shares, etc.

In some embodiments, the contact and the user may have shared content at least a second number of times, where the second number of times is more than the first number of times. The first number of times may have a corresponding first amount of additional storage space available to the user if the user shares content with the frequent contact the first number of times. Likewise, the second number of times that content has been shared may also have a corresponding second amount of potential storage space which may be available to the user if the user shares content with the frequent contact the second number of times and the contact accepts a referral request. For example, if a user shares content with a contact ten (10) times, the user may be provided with 1 GB of additional storage space if the contact accepts a referral request sent by the user. As another example, if the user shares content a certain contact twenty-five (25) times, the user may be provided with 2.5 GB of additional storage space if the contact accepts a referral request sent by the user. The use of 10 and 25 times, as well as 1 GB and 2.5 GB are merely exemplary, and any number of shares and any amounts of storage may be used.

In some embodiments, the contact with whom the user has frequent communications with may be determined by a content management system. The content management system may, in some embodiments, retrieve a share history associated with the user, and analyze the share history to determine which of the user's contacts has frequently been the recipient of shared content. In some embodiments, a frequent contact may be defined by the user. For example, the user may provide an input using their electronic device (e.g., first client electronic device 102a) to define another contact as someone with whom content is frequently shared. For instance, the user of first client electronic device 102a of FIG. 1 may be a work associated of the user of second client electronic device 102b of FIG. 1, and the user of device 102a may provide an input to device 102a and/or a content management system 100 indicating that the user of device 102b is someone with whom he/she frequently shares content with.

Process 1000 may continue at step 1006. At step 1006, an amount of additional storage space available to the user upon acceptance of a first referral request sent to the at least one frequent contact may be determined. The amount of additional storage space may be based on the number of times content has been shared with the contact. The amount of additional storage space available to the user upon acceptance of the referral request sent to the contact may be related to the frequency with which the user and the frequent contact have shared content. For example, contact 602 of FIG. 6 may have been the recipient of shared content with a user a certain amount of times (e.g., 15 times corresponding to 602c. Based on the value of content share information, a certain amount of potential storage space may be available to the user (e.g., 1 GB) upon contact 602 accepting a referral request sent by the user. As another example, contact 604 may have been the recipient of fifty (50) shares, which may correspond to another amount of storage space available to the user, for example, 2.5 GB, which may be more than that corresponding to contact 602.

Process 1000 may then proceed to step 1008. At step 1008, a graphic indicator may be displayed. The graphic indicator may indicate the amount of additional storage space available, each of the user's current storage space and the amount of additional storage space, and/or the relative sizes of the user's current storage space and the amount of additional storage space. For example, based on a referral request sent to contact 602, referral slider 602d may display the potential amount of storage space available upon its acceptance. As above, this potential amount of storage space may depend on the number of times content has been shared with the contact 602.

In some embodiments, a graphic indicator may be displayed showing the total amount of potential storage space available to the user upon the acceptance of one or more referral requests sent to one or more frequent contacts. The graphic indicator may, for example, include a referral slider. For example, contacts 602, 604, and 606 of FIG. 6 may have been the recipients of shared content 15, 50, and 7 times, respectively. Sharing content with a contact 15 times may correspond to 1 GB of additional storage space, whereas sharing content with a contact 50 times and 7 times may respectively correspond to 2.5 GB and 500 MB of additional storage space available. A total or cumulative graphic indicator, such as total referral slider 612 of FIG. 6, may be displayed showing the total amount of storage space available to the user upon each of contacts 602, 604, and 606 accepting a referral request. For example, total referral slider 612 may show that 4 GB of potential free space is available to the user, corresponding to the aggregate amounts of 1 GB of storage space for contact 602, 2.5 GB for contact 604, and 500 MB for contact 606.

Figure 11:
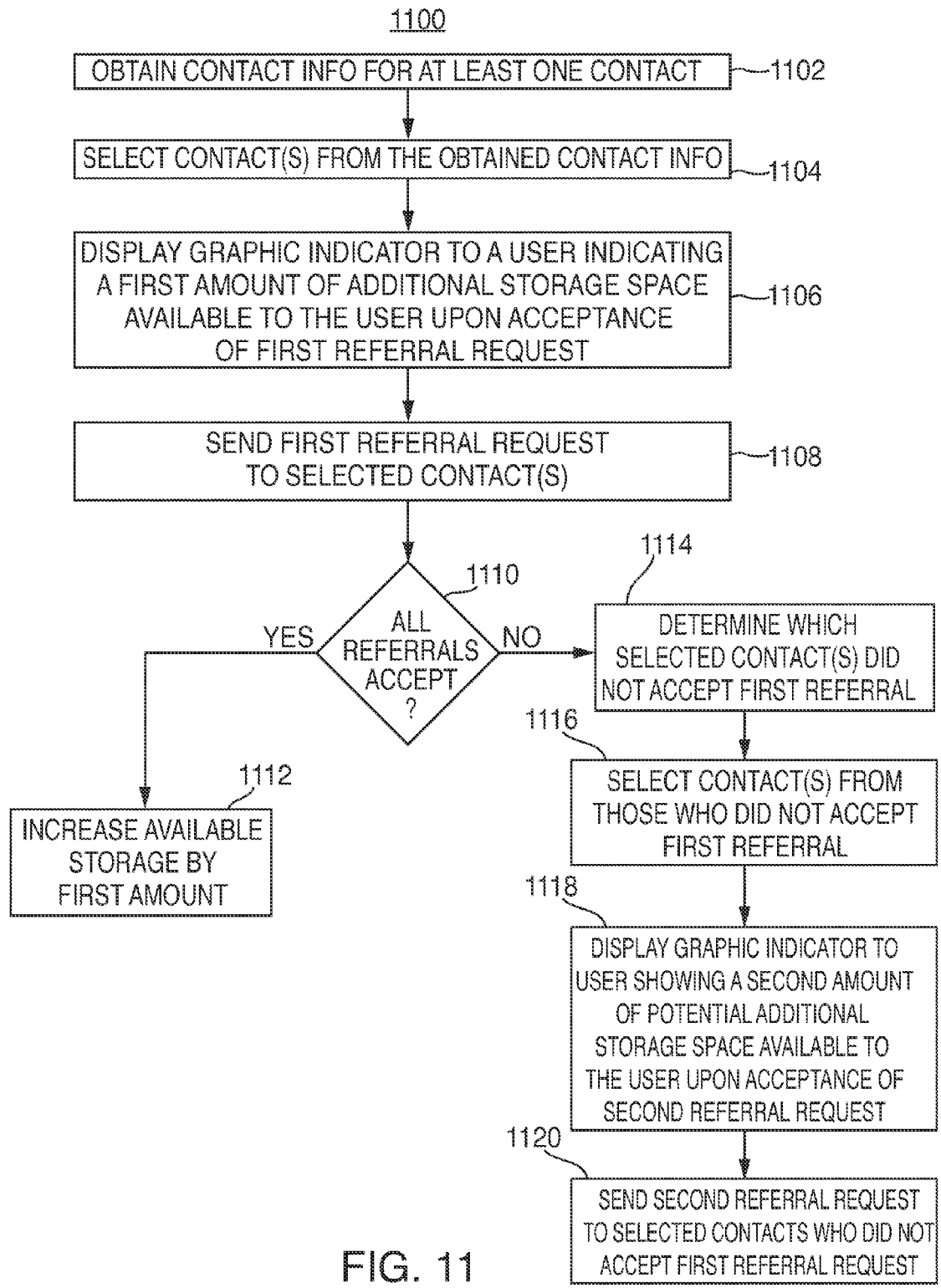
FIG. 11 is an illustrative flowchart of a process in accordance with various embodiments.

FIG. 11 is an illustrative flowchart of process 1100 in accordance with various embodiments. Process 110 may begin at step 1102. At step 1102, contact information for at least one contact may be obtained. As noted above, contact information may include an email address, phone number, instant message name, social media network handle, nickname or username, and/or profile, amongst others. The at least one contact may include any contact associated with a user of a content management system, or other computer accessible service, application or interactive platform. For example, the at least one contact may be associated with second client electronic device 102b of FIG. 1, where the user is the user of first client electronic device 102a. The contact information may be obtained using any suitable mechanism including accessing a user's phone contacts, a user's social media account, and/or accessing a third party application.

Continuing at step 1104, at least one contact may be selected from the contacts. In some embodiments, the user may select the at least one contact. For example, a user may obtain contact information 302d, 304d, and/or 306d pertaining to contacts 302, 304, and/or 306 of FIG. 3. The user may select some or all of the contacts, such as, for example, 304 and 306, by selecting corresponding check boxes 304a and 306a. In some embodiments, a system, such as content management system 100 of FIG. 1, may select the at least one contact. The criteria for selecting the at least one contact may be based on any number of factors including share history, communications history, frequency of content sharing, common domain name, or any other criteria, or any combination thereof.

Process 1100 may then proceed to step 1106. At step 1106, a graphic indicator may be displayed to the user indicating a first amount of additional storage space potentially available to the user upon acceptance of a first referral request sent to the selected contacts. In some embodiments, the graphic indicator may be a referral slider, such as referral slider 312 of FIG. 3. For example, referral slider 312 may indicate to the user of user interface 300 of FIG. 3 that 1 GB of storage space may be available to the user upon acceptance of a referral request sent to selected contacts 304 and 306. Referral slider 312 may be, in some embodiments, a tab that moves along slider bar 310 to indicate to a user an additional amount of storage space potentially available to the user. The amount of storage space may depend on the amount of contacts selected to send a referral request to, as well as the amount of storage space available per selected contact. For example, a user may be provided with 500 MB of storage space upon the acceptance of a referral request sent to each contact, thus if a user were to select two contacts to send referral requests to, the user may be provided with 1 GB of free storage space which may be available to upon acceptance of the two referral requests. The use of 500 MB of storage space per contact is merely exemplary, and any amount of storage space may be available to the user per contact.

In some embodiments, the referral slider may be an icon that moves along a slider bar, such as slider bar 310. In some embodiments, the referral slider may be a movable line, a bar with a fill-in region, a pie chart, and/or a color indicator. For example, referral slider 400 of FIG. 4 may be a fillable bar with filled-in region 410 corresponding to the amount of storage space available to the user upon acceptance of one or more referral requests. As another example, the graphic indicator may be a color indicator. The color indicator may change from a first color to a second color depending on the amount of storage space available to the user. For instance, prior to any contacts being selected, a color indicator may be a first color (e.g., yellow). After selecting one or more contacts to send a referral request to, the color indicator may change to a second color (e.g., green) corresponding to an increase in the amount of storage space available to the user.

Process 1100 may then proceed to step 1108. At step 1108, a first referral request may be sent to the selected contacts. For example, contacts 304 and 306 may be selected to have a referral request sent to them by selection of their corresponding check boxes 304a and 306a. In some embodiments, a user may select an invitation button to send the referral request to the at least one selected contact. For example, a user may invoke or press invitation button 330 of FIG. 3, which may send a first referral request to selected contacts 304 and 306. In some embodiments, selection of check boxes 304*a* and/or 306*a* may send the referral request.

Process 1100 may then proceed to step 1110. At step 1110, a determination may be made about whether or not all of the sent first referral requests have been accepted. In some embodiments, the system (e.g., content management system 100 of FIG. 1) may determine how many of the first referral requests have been accepted. In some embodiments, the determination may be performed by the user of an electronic device (e.g., first client electronic device 102*a* of FIG. 1). In some embodiments, the determination may be performed over a period of time to allow the referees to respond to the referral request. In some embodiments, the determination may be dynamically updated. For example, as a referred contact accepts the first referral request, the determination may continually update to include those accepted contacts as they accept in real time.

If, at step 1110, it is determined that all of the contacts have accept the first referral request, then process 1100 may proceed to step 1112. At step 1112, the amount of storage space available to the user is increased by the first amount of storage space potentially available to the user at step 1106. For example, as previously mentioned, a user may receive 500 MB of additional storage space for every contact who accepts the first referral request. If a user sends the first referral request to two contacts, such as contacts 304 and 306 of FIG. 3, then the user may have potentially been able to receive 1 GB of additional storage space upon acceptance of the first referral request. Thus, if contacts 304 and 306 were to both accept the first referral request, the user would be provided with the 1 GB of additional storage space at step 1112.

If, at step 1110, it is determined that some or all of the contacts have not accepted the first referral request, then process 1100 may proceed to step 1114. At step 1114, a determination may be made of which contacts that were sent the first referral request did not accept. In some embodiments, the determination may be performed by a content management system, such as content management system 100 of FIG. 1. In some embodiments, the determination may be performed by a user of an electronic device, such as a user of first client electronic device 102*a*. In some embodiments, the determination may be performed automatically, and a listing of any contacts who did not accept the first referral request may be generated.

After the contacts who did not accept the first referral request are determined, process 1100 may proceed to step 1116. At step 1116, a selection of contacts to send a second referral request may be performed. For example, a user may send a first referral request to ten contacts. Of those ten contacts, only two may have accepted the first referral request. The user may choose to send a second referral request to some or all of the eight other contacts who did not accept the first referral request, and selection of those eight contacts may occur at step 1116. It should be noted that at step 1114, some contacts may have accepted the first referral request. In this scenario, the user may be provided with the appropriate amount of additional storage space at this point.

Once the contacts are selected to have the second referral request sent to, a graphic indictor may be displayed showing a second amount of potential storage space available to the user upon acceptance of the second referral request at step 1118. In some embodiments, the graphic indicator may correspond to a referral slider (e.g., referral slider 312 of FIG. 3). In some embodiments, the second amount of potential storage space may include an amount of storage space per contact, (similar to step 1108), as well as a "bonus" amount of storage space available to the user for providing the second referral request.

For example, a user may receive a listing of contacts 702, 704, and 706 who have been sent a first referral request. Of contacts 702, 704, and 706, only some contacts (e.g., contacts 704) may have accepted the first referral request. A user may then select additional contacts to send a second referral request at step 1118 (e.g., contacts 702). Once the user selects the contacts to send the second referral request, a second referral slider 722 may display an amount of storage space available to the user upon the acceptance of the second referral request. Additionally, in some embodiments, a referral slider may also be displayed to show a bonus amount of storage space available to the user for sending a second referral request. In some embodiments, a notification may be provided, such as notification 726 of FIG. 7, notifying the user that a bonus amount of storage has been added to the potential amount of storage space available to the user for sending the second referral request. The bonus amount of storage space may be any additional amount of storage space (e.g., 250 MB). Furthermore, at step 1120 the second referral request may be sent to the selected contacts that did not accepted the first referral request.

Figure 12:
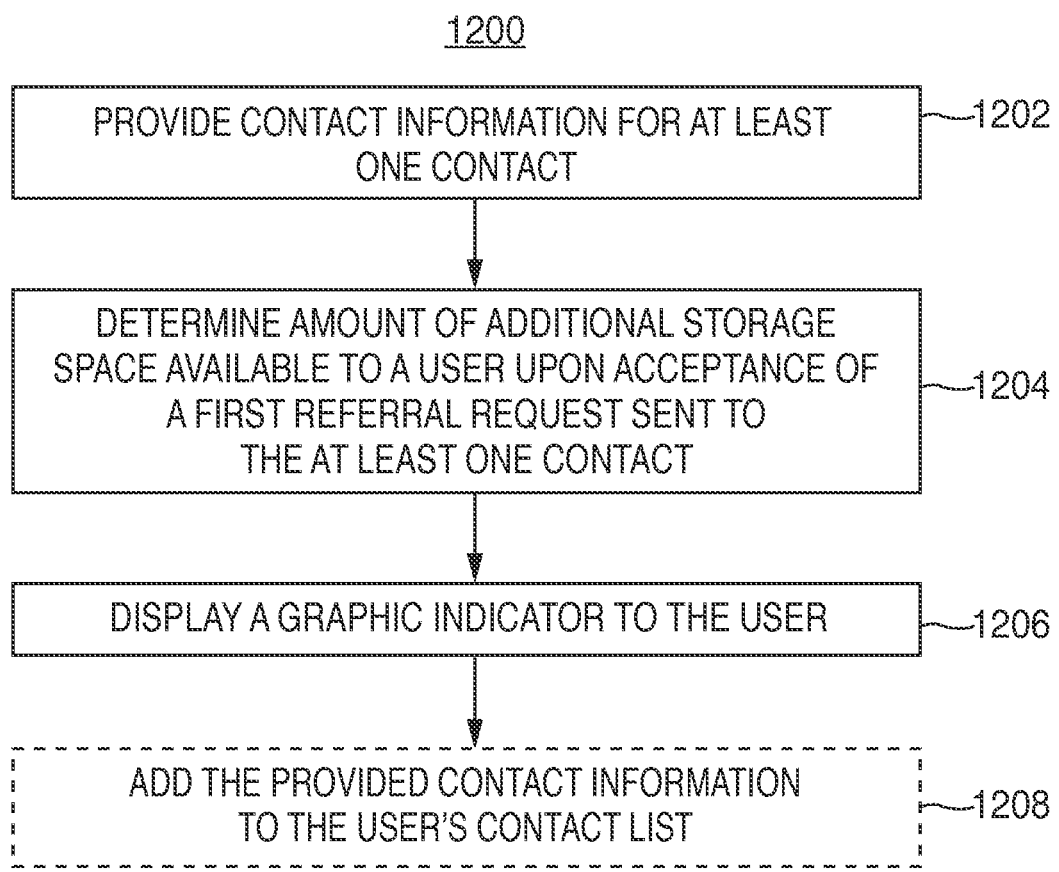
FIG. 12 is an illustrative flowchart of a process in accordance with various embodiments.

FIG. 12 is an illustrative flowchart of process 1200 in accordance with various embodiments. Process 1200 may begin at step 1202. At step 1202, contact information for at least one contact associated with a user of a content management system may be inputted. For example, contact information may be inputted into text box 804 of FIG. 8. In some embodiments, text box 804 may be a search box and upon entering some or all of a contact's information, a search may be performed over one or more databases to determine whether or not the inputted contact information corresponds to a contact associated with a user of a content management system. In some embodiments, text box 804 may be a drop down menu which may allow a user to select one or more contacts.

In some embodiments, the user may input the contact information to share a file or folder with the at least one contact. For example, a user may want to share file 802 of FIG. 8 and input the at least one contact's information into text box 804 to share file 802 with the at least one contact. Contact information may include email addresses, phone numbers, social media profiles, instant message handles, or any other third party application information, or any combination thereof.

At step 1204, an amount of potential additional storage space available to the user upon acceptance of a first referral request may be determined. A default amount of storage space may be defined that is available for an account on a per contact basis. For example, for every contact that accepts a referral request, a user may be provided with 500 MB of additional storage space. Thus, if a user selected two contacts to send a referral request, 1 GB of additional storage space may be available to the user upon acceptance of the referral request. In some embodiments, the amount of storage space may be configured by the user. For example, the user may determine a specific amount of storage space per referred contact and/or a maximum amount of storage available to the user. In some embodiments, both the content management system and/or the user may configure the amount of storage space available. For example, a user may request a certain amount and the system may accept or reject the user's request.

At step 1206, a graphic indicator may be displayed indicating the amount of additional storage space, each of the user's current storage space and the amount of additional storage space, and/or the relative quantities of the user's current storage space the amount of additional storage space. In some embodiments, the graphic indicator may be a referral slider. For example, a referral slider (e.g., referral slider 812 of FIG. 8) may display the potential amount of storage space available to the user (e.g., 500 MB) upon acceptance of a referral request sent to one or more contacts inputted into text box 804. As another example, a first referral slider, such as first referral slider 712 of FIG. 7, may be displayed to convey a user's current amount of storage space, and a second referral slider, such as second referral slider 722 of FIG. 7, may display a user's potential amount of additional storage space.

The referral slider, such as referral slider 812 of FIG. 8, may be any graphic indicator capable of displaying to a user, such as a user of first or second client electronic device 102a or 102b of FIG. 1, the potential amount of storage space available to the user upon the acceptance of one or more referral requests. For example, the referral slider may be a tab displayed to appear as though a slider moves along a slider bar (e.g., slider bar 810 of FIG. 8), a moveable line, a color indicator capable of changing form a first color to a second color, a rectangle with a filled segment (e.g., filled region 406 of referral slider 400 of FIG. 4), a pie chart, or any other graphic indicator, or any combination thereof.

Process 1200 may continue at optional step 1208. At step 1208 the inputted contact information for the at least one contact may be added to the user's contact list. In some embodiments, the user may select an import button, such as import button 806 of FIG. 8, and import the corresponding contact information. Importing contact information may include adding additional information to the contact information provided with text box 804. For example, a user may type an email address into text box 804. Upon determining that the email address may not correspond to any contact of the user, the user may be prompted to add additional information so that a new contact may be added to the user's contact list. Additional information may include an email address, phone number, instant message name, social media profile, or any other third party information, or any combination thereof.

In exemplary embodiments of the present invention, any suitable programming language may be used to implement the routines of particular embodiments including C, C++, Java, JavaScript, Python, Ruby, CoffeeScript, assembly language, etc. Different programming techniques may be employed such as procedural or object oriented. The routines may execute on a single processing device or multiple processors. Although the steps, operations, or computations may be presented in a specific order, this order may be changed in different particular embodiments. In some particular embodiments, multiple steps shown as sequential in this specification may be performed at the same time Particular embodiments may be implemented in a computer-readable storage device or non-transitory computer readable medium for use by or in connection with the instruction execution system, apparatus, system, or device. Particular embodiments may be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments may be achieved by any means as is known in the art. Distributed, networked systems, components, and/or circuits may be used. Communication, or transfer, of data may be wired, wireless, or by any other means.

It will also be appreciated that one or more of the elements depicted in the drawings/figures may also be implemented in a more separated or integrated manner, or even removed or rendered as inoperable in certain cases, as is useful in accordance with a particular application. It is also within the spirit and scope to implement a program or code that may be stored in a machine-readable medium, such as a storage device, to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While there have been described methods for a referral slider, it is to be understood that many changes may be made therein without departing from the spirit and scope of the invention. Insubstantial changes from the claimed subject matter as viewed by a person with ordinary skill in the art, no known or later devised, are expressly contemplated as being equivalently within the scope of the claims. Therefore, obvious substitutions now or later known to one with ordinary skill in the art are defined to be within the scope of the defined elements. The described embodiments of the invention are presented for the purpose of illustration and not of limitation.

What is claimed is:

1. A method for displaying potential incentives to a user, comprising:
at one or more computing devices comprising one or more processors and memory storing one or more computer programs executed by the one or more processors to perform the method, performing operations comprising:
obtaining contact information for a first contact associated with the user;
determining, prior to sending a first referral request to the first contact, a first amount of additional storage space available to the user subject to at least the conditions of: (a) the user approving sending the first referral request to the first contact, and (b) acceptance of the first referral request by the first contact;
displaying a graphic indicator to the user indicating the first amount of additional storage;
obtaining contact information for a second contact associated with the user;
responsive to obtaining the contact information for the second contact, determining a second amount of additional storage space available to the user subject to at least the conditions of: (c) the user approving sending a second referral request to the second contact, and (d) acceptance of the second referral request by the second contact;
responsive to obtaining the contact information for the second contact, updating the graphic indicator to indicate the second amount of additional storage space.

2. The method of claim 1, further comprising:
updating the graphic indicator each time additional contact information is received.

3. The method of claim 2, wherein updating the graphic indicator comprises at least one of:
moving a slider residing on a slider bar from a first position to a second position;

adding a filled segment to a bar chart, the filled segment corresponding to the first amount of additional storage space;

changing the graphic indicator from a first color to a second color; and increasing the graphic indicator from a first size to a second size.

4. The method of claim 2, wherein at least one of:

the user is prompted to add the additional contact information;

a user device is automatically searched for the additional contact information; and a user's email account is searched for the additional contact information.

5. The method of claim 1, wherein the user is prompted to grant access to the user's contacts, and the contact information is obtained from the user's contacts.

6. The method of claim 5, wherein the user's contacts comprise at least one of:

phone contacts, email contacts, social media contacts and friends, and other third party application contacts.

7. The method of claim 1, wherein determining the first amount of additional storage space further comprises:

determining at least one common factor between the user and the first contact, wherein the first amount of additional storage space is based in part on the at least one common factor.

8. The method of claim 7, wherein the at least one common factor comprises at least one of:

a common email domain name;

a common social media network;

a defined frequency of content shares with the at least one contact.

9. The method of claim 1, wherein the graphic indicator comprises at least one of:

a moveable line;

a color indicator operable to change from a first color to a second color; and a rectangle operable to have a filled segment.

10. The method of claim 1, further comprising:

sending an additional referral request to the first contact if the first contact did not accept the first referral request.

11. The method of claim 1, further comprising:

in response to the first contact not accepting the first referral request, determining if the first contact is a frequent contact of the user; and determining a third amount of additional storage space available to the user upon acceptance of an additional referral request sent to the first contact, and displaying the third amount of additional storage space to the user.

12. The method of claim 1, wherein displaying the graphic indicator comprises a pop-up notification provided to the user on a user device.

13. The method of claim 1, further comprising:

detecting a capacity level of storage space available to the user;

determining if the user is using more than a defined fraction of that capacity level; and if yes, providing additional storage space to the user, and display to the user notification thereof.

14. The method of claim 1, wherein the first amount of additional storage space is configurable by the user.

15. The method of claim 1, further comprising:

retrieving a content share history corresponding to the at least one contact; and analyzing the content share history to determine at least one of the at least one contact to send the first referral request to.

16. The method of claim 1, wherein the graphic indicator indicates a current storage space of the user.

17. The method of claim 16, wherein the graphic indicator indicates the relative sizes of the current storage space of the user and the second amount of additional storage space.

18. A non-transitory computer readable medium containing instructions that, when executed by at least one processor of a computing device, cause the computing device to:

obtain contact information for a first contact associated with a user;

determine, prior to sending a first referral request to the first contact, a first amount of additional storage space available to the user subject to at least the conditions of: (a) the user approving sending the first referral request to the first contact, and (b) acceptance of the first referral request by the first contact;

display a graphic indicator to the user indicating the first amount of additional storage;

obtain contact information for a second contact associated with the user;

responsive to obtaining the contact information for the second contact, determine a second amount of additional storage space available to the user subject to at least the conditions of: (c) the user approving sending a second referral request to the second contact, and (d) acceptance of the second referral request by the second contact;

responsive to obtaining the contact information for the second contact, update the graphic indicator to indicate the second amount of additional storage space.

19. The non-transitory computer readable medium of claim 18, wherein updating the graphic indicator comprises at least one of:

moving a slider residing on a slider bar from a first position to a second position;

adding a filled segment to a bar chart, the filled segment corresponding to the first amount of additional storage space;

changing the graphic indicator from a first color to a second color; and increasing the graphic indicator from a first size to a second size.

20. The non-transitory computer readable medium of claim 18, wherein determining the first amount of additional storage space further comprises:

determining at least one common factor between the user and the first contact, wherein the first amount of additional storage space is based in part on the at least one common factor.

21. The non-transitory computer readable medium of claim 18, wherein the graphic indicator comprises at least one of:

a moveable line;

a color indicator operable to change from a first color to a second color; and a rectangle operable to have a filled segment.

22. The non-transitory computer readable medium of claim 18, when executed by the at least one processor of the computing device, further causes the computing device to:

send an additional referral request to the first contact if the first contact did not accept the first referral request.

23. The non-transitory computer readable medium of claim 18, when executed by the at least one processor of the computing device, further causes the computing device to:

in response to the first contact not accepting the first referral request, determine if the first contact is a frequent contact of the user; and determining a third amount of additional storage space available to the user upon acceptance of an additional referral request sent to the first contact, and displaying the third amount of additional space to the user.

24. The non-transitory computer readable medium of claim 18, when executed by the at least one processor of the computing device, further causes the computing device to:

retrieve a content share history corresponding to the at least one contact; and analyze the content share history to determine at least one of the at least one contact to send the first referral request to.

25. A system for displaying potential incentives to a user, the system comprising:

at least one processor;

a display; and memory containing instructions that, when executed, cause the at least one processor to:

obtain contact information for a first contact associated with the user;

determine, prior to sending a first referral request to the first contact, a first amount of additional storage space available to the user subject to at least the conditions of: (a) the user approving sending the first request to the first contact, and (b) acceptance of the first referral request by the first contact;

display a graphic indicator to the user indicating the first amount of additional storage;

obtain contact information for a second contact associated with the user;

responsive to obtaining the contact information for the second contact, determine a second amount of additional storage space available to the user subject to at least the conditions of: (c) the user approving sending a second referral request to the second contact, and (d) acceptance of the second referral request by the second contact;

responsive to obtaining the contact information for the second contact, update the graphic indicator to indicate the second amount of additional storage space.

* * * * *